United States Patent
Naveh et al.

(10) Patent No.: US 12,056,578 B1
(45) Date of Patent: Aug. 6, 2024

(54) QUANTUM OPERATING SYSTEM UTILIZING MULTIPLE COMPILERS

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Nir Minerbi, Haifa (IL); Yehuda Naveh, Tel Aviv (IL); Ofek Kirzner, Haifa (IL); Ravid Alon, Tel Aviv (IL)

(73) Assignee: Classiq Technologies LTD., Tel Aviv (IL)

(*) Notice: Subject to any disclaimer, the term of this patent is extended or adjusted under 35 U.S.C. 154(b) by 0 days.

(21) Appl. No.: 18/381,022

(22) Filed: Oct. 17, 2023

(51) Int. Cl.
*G06N 10/80* (2022.01)

(52) U.S. Cl.
CPC .................... *G06N 10/80* (2022.01)

(58) Field of Classification Search
CPC ........................................... G06N 10/80
See application file for complete search history.

(56) References Cited

U.S. PATENT DOCUMENTS 11,373,114 B1 * 6/2022 Naveh ............... G06N 5/01

\* cited by examiner

*Primary Examiner* — Alan Chen
(74) *Attorney, Agent, or Firm* — Myers Wolin, LLC

(57) ABSTRACT

A method, apparatus and product comprising: generating, by a first software compiler, an intermediate-level data structure based on a quantum program, the intermediate-level data structure is a Directed Acyclic Graph (DAG) that is a non-executable representation of the quantum program; initiating a first execution of the quantum program at the quantum execution platform by: obtaining, at a second software compiler, first real-time constraints on an availability of resources of the quantum execution platform for the first execution; generating, based on the first real-time constraints, a first quantum circuit that implements the DAG; and providing the first quantum circuit to the quantum execution platform to be executed thereon; and initiating a second execution of the quantum program at the quantum execution platform by: obtaining second real-time constraints on an availability of resources; generating a second quantum circuit; and providing the second quantum circuit to the quantum execution platform.

26 Claims, 8 Drawing Sheets

QUANTUM OPERATING SYSTEM UTILIZING MULTIPLE COMPILERS

TECHNICAL FIELD

The present disclosure relates to quantum computing in general, and to managing compilations and executions of quantum circuits, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits, referred to as quantum gates, must be reversible (e.g., besides measurements). Temporarily computed values are stored on additional helper qubits, referred to as auxiliary qubits.

BRIEF SUMMARY

One exemplary embodiment of the disclosed subject matter is a method comprising: generating, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform; initiating a first execution of the quantum program at the quantum execution platform, wherein said initiating the first execution comprises: obtaining, by a second software compiler that is different from the first software compiler, first real-time constraints on an availability of resources of the quantum execution platform for the first execution; generating, by the second software compiler, and based on the first real-time constraints, a first quantum circuit that implements the DAG and is executable by the quantum execution platform; and providing the first quantum circuit to the quantum execution platform to be executed thereon; and initiating a second execution of the quantum program at the quantum execution platform, wherein said initiating the second execution comprises: obtaining, by the second software compiler, second real-time constraints on an availability of resources of the quantum execution platform for the second execution; generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

Optionally, the intermediate-level data structure comprises two or more alternative implementations of a node of the at least one node that is not executable the DAG; said generating the first quantum circuit comprises selecting a first implementation from the two or more alternative implementations of the node; and said generating the second quantum circuit comprises selecting a second implementation from the two or more alternative implementations of the node, the second implementation is different from the first implementation.

Optionally, said generating the intermediate-level data structure comprises selecting from a library a subset of potential alternative implementations of the node, wherein the subset comprises the two or more alternative implementations.

Optionally, said generating the intermediate-level data structure comprises dynamically synthesizing the first implementation and the second implementation.

Optionally, said generating the intermediate-level data structure comprises synthesizing an executable node, the executable node is executable by the quantum execution platform, wherein the DAG comprises the executable node, wherein the first and second quantum circuits comprise the executable node, whereby computational resources associated with synthesizing the executable node are utilized only once by the first software compiler, and the second software compiler utilizes an outcome of the first software compiler, thereby the computational resources are not utilized by the second software compiler.

Optionally, said generating the intermediate-level data structure comprises: determining a Constraint Satisfaction Problem (CSP) that corresponds to the quantum program, the CSP comprises variables, domains and constraints, each variable of the variables has a corresponding domain in the domains that defines one or more potential values of the variable, the constraints define one or more constraints on values of the variables or portion thereof, the constraints comprise global resource constraints of the quantum execution platform, the domains include a domain of a variable, wherein a solution of the CSP defines a quantum circuit that implements the quantum program and complies with the constraints; determining a sub-domain for the variable, whereby defining a simplified CSP, the simplified CSP uses the sub-domain instead of the domain with respect to the variable, a solution of the simplified CSP defines a respective quantum circuit that implements the quantum program; and wherein said generating the first quantum circuit comprises defining a first execution-specific simplified CSP that comprises the simplified CSP and the first real-time constraints, and utilizing a CSP solver to solve the first execution-specific simplified CSP, whereby the CSP solver utilizes a reduced amount of computational resources for solving the first execution-specific simplified CSP compared to an amount of computational resources that is required for solving an execution-specific CSP that includes the CSP and the first real-time constraints; and wherein said generating the second quantum circuit comprises defining a second execution-specific simplified CSP that comprises the simplified CSP and the second real-time constraints, and utilizing the CSP solver to solve the second execution-specific simplified CSP, whereby the CSP solver utilizes a reduced amount of computational resources for solving the second execution-specific simplified CSP compared to an amount of computational resources that is required for solving an execution-specific CSP that includes the CSP and the second real-time constraints.

Optionally, the constraints of the CSP comprise the precedence constraint of each edge of the DAG.

Optionally, said determining the sub-domain comprises: determining that all solutions of the CSP comprise a same single value of the variable, wherein the domain includes the single value and at least one additional value; and determining the sub-domain to be a singleton domain consisting of only the same single value.

Optionally, an availability of the resources comprise at least one of: a connectivity configuration of available qubits of the quantum execution platform; a number of the available qubits of the quantum execution platform for a time period; and a number of the available qubits of the quantum execution platform of a specific qubit type for a timeframe.

Optionally, the first real-time constraints depend on a previous quantum circuit that is being executed on the quantum execution platform, the previous quantum circuit implements a second quantum program.

Optionally, the quantum program and the second quantum program are provided to the first software compiler from different entities.

Optionally, the second real-time constraints depend on the first execution of the first quantum circuit by the quantum execution platform, whereby the second execution of the second quantum circuit is generated to be performed in parallel to at least a portion of the first execution of the first quantum circuit.

Optionally, the intermediate-level data structure excludes any implementation of a node of the DAG, wherein the implementation of the node is determined by the second software compiler.

Optionally, the quantum execution platform comprises a quantum computing cloud or a quantum computer.

Optionally, an implementation of a node of the DAG comprises a set of one or more logical qubits that are being manipulated over a plurality of cycles.

Optionally, the DAG comprises at least one node that is represented by a functional block, the functional block representing the functionality that the quantum program is designed to implement in the quantum circuit.

Optionally, the second quantum circuit utilizes different quantum resources than the first quantum circuit, the quantum resources comprise at least qubits, gates, and cycles.

Optionally, the method further comprises obtaining the quantum program from a programmer.

Optionally, said generating the intermediate-level data structure is performed as part of a compilation process of the quantum program, the compilation process includes parsing the quantum program, whereby the second software compiler is configured to avoid parsing the quantum program and to re-use an output of the first software compiler.

Optionally, the first software compiler is a batch compiler configured to be executed once for the quantum program, wherein the second software compiler is an online compiler configured to be executed for every execution of the quantum program on the quantum execution platform.

Another exemplary embodiment of the disclosed subject matter is an apparatus comprising a processor and coupled memory, said processor being adapted to: generate, by a first software compiler, an intermediate-level data structure based on a quantum program, the intermediate-level data structure is a DAG, the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform; initiate a first execution of the quantum program at the quantum execution platform, wherein said initiate the first execution comprises: obtaining, by a second software compiler that is different from the first software compiler, first real-time constraints on an availability of resources of the quantum execution platform for the first execution; generating, by the second software compiler, and based on the first real-time constraints, a first quantum circuit that implements the DAG and is executable by the quantum execution platform; and providing the first quantum circuit to the quantum execution platform to be executed thereon; and initiate a second execution of the quantum program at the quantum execution platform, wherein said initiate the second execution comprises: obtaining, by the second software compiler, second real-time constraints on an availability of resources of the quantum execution platform for the second execution; generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

Yet another exemplary embodiment of the disclosed subject matter is a system comprising a processor and coupled memory, said processor being adapted to: generate, by a first software compiler, an intermediate-level data structure based on a quantum program, the intermediate-level data structure is a DAG, the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform; initiate a first execution of the quantum program at the quantum execution platform, wherein said initiate the first execution comprises: obtaining, by a second software compiler that is different from the first software compiler, first real-time constraints on an availability of resources of the quantum execution platform for the first execution; generating, by the second software compiler, and based on the first real-time constraints, a first quantum circuit that implements the DAG and is executable by the quantum execution platform; and providing the first quantum circuit to the quantum execution platform to be executed thereon; and initiate a second execution of the quantum program at the quantum execution platform, wherein said initiate the second execution comprises: obtaining, by the second software compiler, second real-time constraints on an availability of resources of the quantum execution platform for the second execution; generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

Yet another exemplary embodiment of the disclosed subject matter is a computer program product comprising a non-transitory computer readable medium retaining program instructions, which program instructions, when read by a processor, cause the processor to: generate, by a first software compiler, an intermediate-level data structure based on a quantum program, the intermediate-level data structure is a DAG, the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform; initiate a first execution of the quantum program at the quantum execution platform, wherein said initiate the first execution comprises: obtaining, by a second software compiler that is different from the first software compiler, first real-time constraints on an availability of resources of the quantum execution platform for the first execution; generating, by the second software compiler, and based on the first real-time constraints, a first quantum circuit that implements the DAG and is executable by the quantum execution platform; and providing the first quantum circuit to the quantum execution platform to be executed thereon; and initiate a second execution of the quantum program at the quantum execution platform, wherein said initiate the second execution comprises: obtaining, by the second software compiler, second real-time constraints on an availability of resources of the quantum execution platform for the second execution; generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
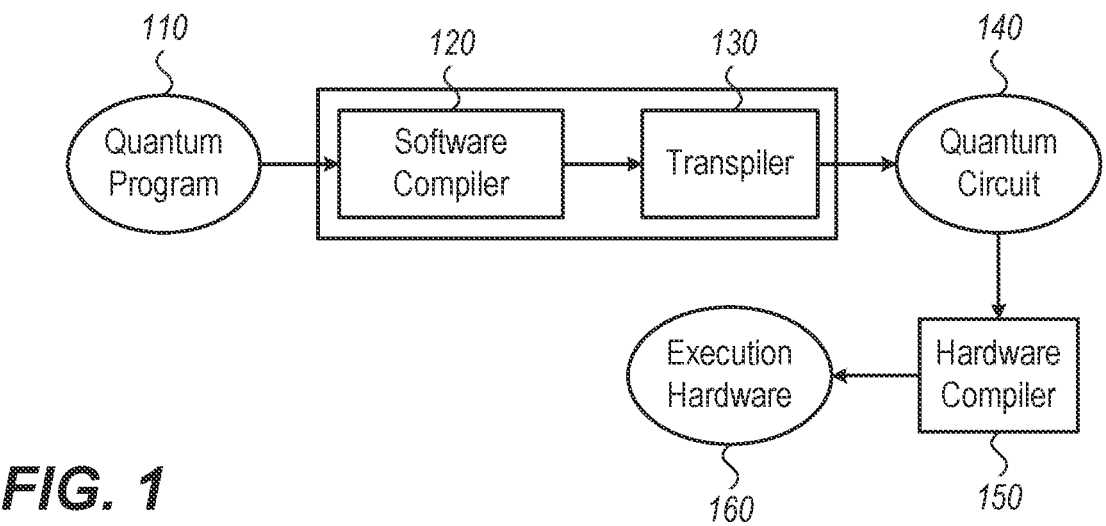
FIG. 1 shows an exemplary compilation and execution flow, in accordance with some exemplary embodiments of the disclosed subject matter.

One technical problem dealt with by the disclosed subject matter is to reduce the number of resources used by a quantum execution platform (e.g., a quantum computer, a quantum computing cloud, or the like) for executing one or more quantum circuits. In some exemplary embodiments, a user such as a programmer may generate, design, program, or the like a quantum program. In some exemplary embodiments, the quantum program may be designed using a high level language, a functional-level code, evolutionary computing techniques such as Quantum Genetic Algorithm (QGA), genetic algorithms, or the like. In some exemplary embodiments, after an initial quantum program is created, the program may progress through multiple stages before becoming a quantum circuit that can be executed by the quantum execution platform that is scheduled to execute the program.

In some exemplary embodiments, a compilation process of a quantum program may be performed by one or more classical computing modules of a classical computer, which may synthesize a quantum circuit that complies with global constraints of the quantum execution platform, such as a total number of qubits belonging to the quantum execution platform, without taking into account real-time constraints, such as that most of the qubits are not currently available. It is noted that the term 'qubit', as used herein, may refer to an individual qubit, a set of two or more qubits (e.g., a qubit register), or the like.

In some exemplary embodiments, resources of the quantum execution platform, such as qubits, gates, cycles, or the like, may not necessarily be utilized by the compiled quantum circuit in an optimal manner. For example, in case the quantum circuit does not utilize the available resources of the quantum execution platform efficiently, the resource utilization of the quantum circuit may be suboptimal. In some exemplary embodiments, a suboptimal resource utilization of a quantum circuit may cause an overall execution time of the quantum execution platform to be longer, an overall number of cycles to be greater, a number of non-utilized idle qubits at every cycle to be larger, or the like, compared to a more optimal resource utilization of a quantum circuit.

As an example, global constraints of the quantum execution platform may indicate that the quantum execution platform has, overall, 50 qubits, but may not indicate that the quantum execution platform is currently executing a previous program that uses 30 of these qubits, leaving only 20 qubits for the inspected quantum program. In such cases, the quantum program will be compiled to utilize 50 qubits, according to the global constraints, generating a suboptimal quantum circuit that cannot be executed by the quantum execution platform until the previous program completes its execution, thus wasting available resources of the quantum execution platform such as cycles, qubits, or the like. For example, in the above scenario, the remaining 20 qubits may remain idle until the previous program execution is completed, which may take a long duration, e.g., thousands or millions of cycles. It may be desired to overcome such drawbacks.

Referring now to FIG. 1, showing an exemplary compilation and execution flow, in accordance with some exemplary embodiments of the disclosed subject matter.

In some exemplary embodiments, during the quantum compilation process, one or more classical computer units, such as a Software Compiler 120 and a Transpiler 130, may obtain a high-level quantum program from a user, such as Program 110, and generate a logical Quantum Circuit 140 based thereon. For example, Program 110 may comprise a non-executable representation of a functionality that is intended to be implemented by a quantum circuit. In some cases, a single software tool may comprise both Software Compiler 120 and Transpiler 130, or, alternatively, they may comprise separate software modules or tools. In some exemplary embodiments, Software Compiler 120 may be configured to compile Program 110, and Transpiler 130 may be configured to adjust the compiled program to match global resources of a quantum execution platform (e.g., to comply with a global constraint on a number of qubits of the quantum execution platform), thereby synthesizing Quantum Circuit 140. In some exemplary embodiments, the global resources may comprise at least a total number of qubits in the quantum execution platform, a total number of qubits of a given type in the quantum execution platform, a total number of quantum gates in the quantum execution platform, or the like. In some exemplary embodiments, the global resources may not include availability information, such as information regarding whether or not resources are available, or whether they are used by other programs and are thus unavailable. For example, although a global constraint may indicate that the quantum execution platform has 100 qubits, only 20 may be in fact available, as the other 80 may be utilized for executing programs.

In some exemplary embodiments, Quantum Circuit 140, which is synthesized by Transpiler 130, may comprise an executable representation of Program 110 that can be managed by the quantum execution platform. For example, Quantum Circuit 140 may be generated in the form of a logical quantum circuit, a logical data structure such as a Directed Acyclic Graph (DAG), or in the form of any other data structure. In some cases, Quantum Circuit 140 may comprise qubit allocations, and may or may not rely on a Hardware Compiler 150 of the quantum execution platform for allocating cycles for each operation.

In some exemplary embodiments, Quantum Circuit 140 may be provided to a Hardware Compiler 150 of the quantum execution platform. In some cases, the specific allocation of physical qubits to logical qubits, and the selection of cycles for each operation may be performed at Hardware Compiler 150, in view of real-time constraints of the quantum execution platform. For example, Quantum Circuit 140 may be provided in a form of a DAG, and Hardware Compiler 150 may select cycles for each operation, by "positioning" nodes of a received DAG over a two dimensional plane of cycles and qubits. In some exemplary embodiments, a physical quantum circuit generated by Hardware Compiler 150 may be executed on the quantum execution platform (denoted Execution Hardware 160), a quantum computer thereof, or the like.

In some exemplary embodiments, in the scenario of FIG. 1, Quantum Circuit 140 may be suboptimal, at least since Quantum Circuit 140 may not take into account the resource utilization situation of the quantum execution platform. For example, the quantum execution platform may be required to wait for previous programs to complete execution before being able to implement Quantum Circuit 140, although Program 110 can potentially be compiled to be implemented in a manner that matches the real-time constraints of the quantum execution platform. It may be desired to overcome such drawbacks.

Another technical problem dealt with by the disclosed subject matter is to enhance a compilation process to accommodate a current resource utilization situation of the quantum execution platform. In some exemplary embodiments, the resource utilization situation may comprise unavailable resources that are utilized by other programs until specific timeframes have passed, resources that are available for a short period of time but are reserved for future timeframes, unavailable resources that are scheduled be released shortly, or the like. For example, it may be desired to compile a quantum program such that the program will be able to use available resources without being required to wait until all previous executions terminate.

In some cases, it may be challenging to take into account the resource utilization situation of the quantum execution platform when compiling a program, at least since programs may be scheduled to be executed a plurality of times, and the resource utilization situation may change frequently, thus requiring to compile a same program a plurality of times.

One technical solution provided by the disclosed subject matter is obtaining real-time constraints on an availability of resources of the quantum execution platform, and adjusting a compilation process of a quantum program accordingly. In some exemplary embodiments, the adjusted compilation process may be part of a quantum operating system that is configured to execute quantum programs while taking into account resources available in the quantum execution platform. The quantum operating system may potentially compile and execute the quantum programs in a manner that optimizes a resources utilization of the quantum execution platform.

In some exemplary embodiments, the real-time constraints of the quantum execution platform may indicate a number and/or identity of unavailable resources that are utilized by other programs until specific timeframes have passed, a number and/or identity of resources that are available for a short period of time but are reserved for future timeframes, a number and/or identity of unavailable resources that are scheduled be released shortly, connectivity characteristics of the available qubits, a limit on a number of quantum gates that the quantum execution platform is able to execute at once (or during a defined range of cycles), or the like. For example, the real-time constraints may indicate that qubits number 4-6 (e.g., the qubits' identity) are currently idle and will remain idle for another 10 cycles, that 13 unidentified qubits will be released in 5 cycles from now, that qubits number 15-25 will be allocated to an execution of a different program between cycles 250-400, that qubits number 20-30 will be idle between cycles 100-210, that qubits 3 and 4 are currently available and are directly connected, or the like.

In some cases, the transpiler may be configured to obtain the real-time constraints, or portion thereof, from the quantum execution platform (e.g., from its hardware compiler), and forward them to the software compiler. For example, the transpiler may be configured to obtain the real-time constraints every time that a quantum program is scheduled to be compiled by the software compiler, every time that a compiled program is obtained by the transpiler, or the like. In some exemplary embodiments, the software compiler may obtain the real-time constraints from the transpiler, and re-compile the quantum program to match the real-time constraints. For example, the software compiler may re-compile the quantum program to utilize available resources before previous executions are terminated. In some exemplary embodiments, the software compiler may provide the re-compiled logical quantum circuit to the transpiler to be transpiled, and the transpiler may provide the resulting logical quantum circuit to the quantum execution platform, to be executed thereon.

In some cases, this compilation flow may be suboptimal, at least since the software compiler may be required to re-compile the same quantum program, thus wasting time and computational resources. In some exemplary embodiments, to overcome this drawback, the software compiler may be configured to compile quantum programs in a manner that, a priori, reduces computational resources for the recompilation process. For example, a quantum program may be compilable into at least two alternative logical quantum circuits that implement a same quantum program, a first of which can be recompiled faster than the second quantum circuit. In this example, the software compiler may compile the quantum program to the first quantum circuit and not to the second quantum circuit.

Figure 2A:
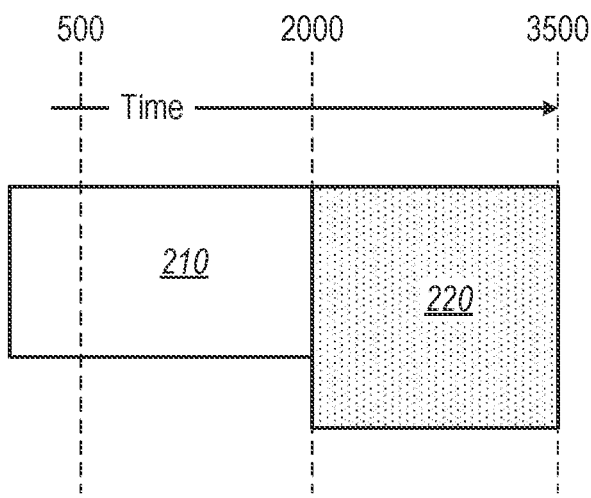
FIGS. 2A-2C show exemplary quantum executions, in accordance with some exemplary embodiments of the disclosed subject matter.
Figure 2B:
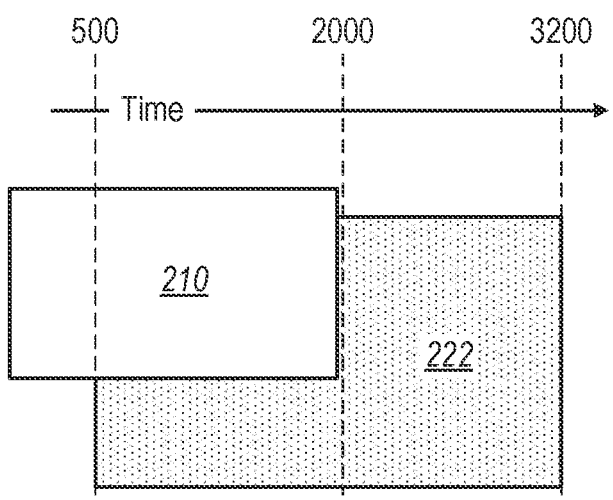
Figure 2C:
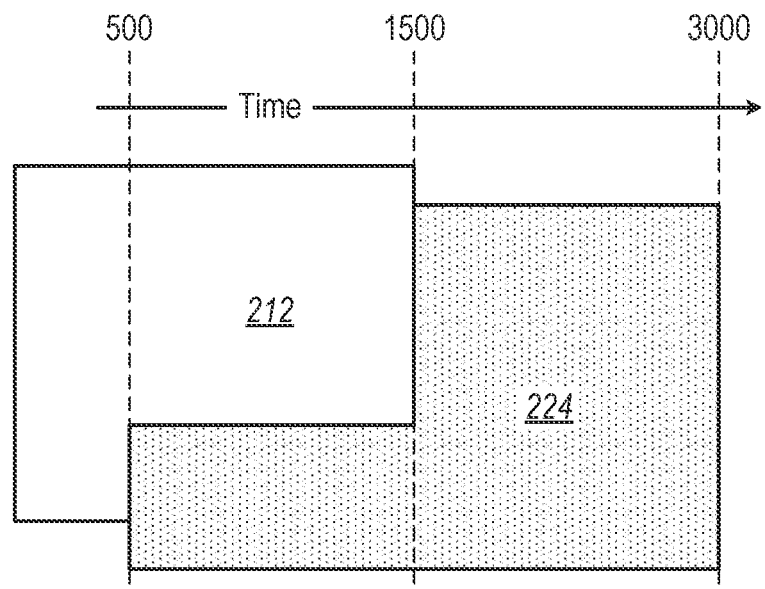

In some exemplary embodiments, FIGS. 2A-2C depict different compilation processes of a quantum program that can be performed in accordance with some exemplary embodiments of the disclosed subject matter.

Referring now to FIG. 2A, showing an exemplary suboptimal quantum execution, in accordance with some exemplary embodiments of the disclosed subject matter. As depicted in FIG. 2A, Quantum Circuit 210 may be executed on a quantum computer that has 50 qubits in total (e.g., as defined by a global constraint). Quantum Circuit 210 may utilize only a portion of the total number of qubits of the quantum computer, e.g., 30 qubits thereof, leaving 20 qubits idle. Quantum Circuit 210 may be configured to be executed for 2,000 cycles.

In some exemplary embodiments, a quantum program may be compiled according to global constraints of the quantum computer, and provided to the quantum computer as Quantum Circuit 220. Quantum Circuit 220 may be obtained by the quantum computer at cycle 500 of executing the previous circuit, e.g., Quantum Circuit 210. In some exemplary embodiments, Quantum Circuit 220 may be configured to utilize 40 qubits for 1,500 cycles. In some exemplary embodiments, since the quantum computer may not have 40 available qubits for executing Quantum Circuit 220 at cycle 500, the quantum computer may wait another 1,500 cycles for the execution of Quantum Circuit 210 to be completed, before starting to execute Quantum Circuit 220.

In some exemplary embodiments, this scenario may be suboptimal, at least since the remaining 20 qubits may remain idle for 2,000 cycles instead of being utilized for executing Quantum Circuit 220. Additionally the scenario of FIG. 2A is suboptimal at least since the overall execution time of Quantum Circuits 210 and 220 may be longer than other configurations (e.g., the configuration of FIG. 2B), which may increase a cost of the execution also adversely affect the quality of the resulting quantum states (e.g., the error rates thereof).

Referring now to FIG. 2B, showing an exemplary enhanced quantum execution that is enhanced with respect to the scenario of FIG. 2A, in accordance with some exemplary embodiments of the disclosed subject matter. In some exemplary embodiments, instead of maintaining the 20 qubits of the quantum computer in an idle state for 1,500 cycles, the quantum program may be re-compiled to match the available resources of the quantum computer, e.g., to utilize the 20 remaining qubits of the quantum computer for executing Quantum Circuit 220.

In some exemplary embodiments, the software compiler and the transpiler may compile the quantum program, generating a first quantum circuit (e.g., Quantum Circuit 220). In some exemplary embodiments, the transpiler may obtain the real-time constraints from the quantum computer, or a hardware compiler thereof, indicating that the requested 40 qubits will not available until cycle 2,000, but 20 qubits will be available until cycle 2,000. In some exemplary embodiments, the transpiler may provide the constraints to the software compiler, which may recompile the quantum program to comply with the real-time constraints, thereby replacing the first quantum circuit with a second quantum circuit, e.g., Quantum Circuit 222. For example, Quantum Circuit 222 may utilize the remaining 20 qubits from cycle 500 and onwards for 1,500 cycles, and then utilizes 40 qubits for a reduced number of cycles, e.g., 1,200 cycles instead of the original 1,500 cycles. As depicted in FIG. 2B, replacing Quantum Circuit 220 with Quantum Circuit 222 results with a reduced number of idle qubits per cycle, a shorter overall execution time of both circuits, a lower error rate of an output qubit, or the like.

Referring now to FIG. 2C, showing an exemplary enhanced quantum execution that is enhanced with respect to the scenario of FIGS. 2A, in accordance with some exemplary embodiments of the disclosed subject matter. In some cases, in addition to or instead of recompiling the quantum circuit to match the real-time constraints, as performed in the scenario of FIG. 2B, Quantum Circuit 210 may be replaced with Quantum Circuit 212.

For example, Quantum Circuit 210 may comprise an implementation of a second quantum program. According to this example, the second quantum program may be compiled, transpiled, or the like, according to global constraints of the quantum computer, and the transpiler may obtain first real-time constraints from the hardware compiler, indicating that all 50 qubits of the quantum computer are available at a start of the execution. In some exemplary embodiments, in response, the second quantum program may be recompiled, e.g., by the transpiler and/or software compiler, to utilize an increased number of qubits compared to Quantum Circuit 210. For example, instead of using 30 qubits, as utilized by Quantum Circuit 210, Quantum Circuit 212 may be compiled to utilize a greater number of qubits, such as 40 qubits. This may enable to execute the second quantum program in a shorter time period, and may enable the following quantum program, e.g., Quantum Circuit 224, to obtain released qubits at an earlier stage compared to the scenario of FIG. 2B. For example, Quantum Circuit 212 may complete its execution at cycle 1,500, which is 500 cycles earlier than the scenario of FIGS. 2A and 2B.

In some cases, Quantum Circuit 212 may be generated based on a cost function, e.g., as part of an optimization process attempting to minimize the cost function. For example, the cost function may assign a value of zero, or a negative value, for utilizing the 20 remaining qubits that are not utilized by Quantum Circuit 210, causing the software compiler and/or transpiler to utilize at least some of the remaining 20 qubits, thereby generating Quantum Circuit 212.

In some exemplary embodiments, after Quantum Circuit 212 is executed for 500 cycles, the quantum computer may obtain a following program for execution, e.g., Quantum Circuit 224. In some exemplary embodiments, Quantum Circuit 224 may be compiled and transpiled according to second subsequent real-time constraints, indicating that Quantum Circuit 212 utilized 40 qubits until cycle 500, and will utilize 30 qubits between cycles 500 and 1,500. For example, Quantum Circuit 224 may be obtained from compiling the program a first time, and recompiling the program according to the second real-time constraints. In some exemplary embodiments, Quantum Circuit 224 may utilize 20 qubits between cycles 500 and 1,500, and 40 qubits until completing execution. Since, in the disclosed scenario, Quantum Circuit 212 completes its execution early, also Quantum Circuit 224, which depends on the execution of Quantum Circuit 212, may complete its execution early, e.g., on cycle 3,000 (instead of completing its execution on cycles 3,500 and 3,200 in the scenarios of FIGS. 2A and 2B, respectively). As a result, the execution of Quantum Circuits 212 and 224 may have a reduced number of idle qubits per cycle, a shorter overall execution time, a lower error rate of output qubits, or the like, e.g., compared to the scenarios of FIGS. 2A and 2B.

In some cases, in the scenarios of FIGS. 2A-2C, the quantum programs may be required to be recompiled, causing the software compiler and the transpiler to process the same quantum program twice, for each execution of the program. This process may waste computational and time resources, and thus be suboptimal. It is noted that quantum programs are typically executed a plurality of times, e.g., hundreds or thousands of times. It may be desired to provide a compilation architecture that does not require to process each program twice for each execution, which does not include back-and-forth iterations between the software compiler and the transpiler, or the like, while still accommodating real-time constraints of a quantum execution platform.

One technical solution provided by the disclosed subject matter is providing a compilation architecture that replaces the software compiler and the transpiler with alternative classical software modules, e.g., first and second software compilers. In some exemplary embodiments, the compilation architecture may take into account an availability of resources of the target quantum execution platform, while eliminating the need to fully compile each program twice for each execution, and preventing back-and-forth iterations between the first and second software compilers.

In some exemplary embodiments, the first software compiler may be configured to perform a partial compilation of an obtained quantum program, which can be used for all executions of the program. In some exemplary embodiments, the partial compilation may generate, or synthesize, an intermediate-level data structure, such as an intermediate-level DAG, that accommodates global constraints of a quantum execution platform. For example, the first software compiler may be configured to generate an intermediate-level DAG that is estimated to be adjustable for various potential scenarios of real-time constraints. In some exemplary embodiments, the intermediate-level DAG may not be executable by the quantum execution platform, and thus may require further processing by the second software compiler.

In some exemplary embodiments, the second software compiler may be configured to communicate with the quantum execution platform, and obtain therefrom real-time constraints. In some exemplary embodiments, the second software compiler may utilize the real-time constraints to complete the compilation of the intermediate-level DAG for each execution of the program, for one or more sets of execution of the program, or the like. For example, the second software compiler may adjust the intermediate-level DAG in view of real-time constraints. In some exemplary embodiments, in contrast to the scenarios of FIGS. 2A-2C, the first and second software compilers may enable to execute a program according to real-time constraints, without performing a full recompilation from scratch of the program for each execution thereof.

In some exemplary embodiments, the first software compiler may be configured to perform in advance one or more compilation calculations, without having access to real-time constraints, such as in order to reduce a computational load from the second software compiler. For example, the first software compiler may prepare in advance portions of the quantum circuit within the intermediate-level DAG. In some cases, the second software compiler may have a limited delay threshold, and thus may not be able to perform computationally-intensive operations. In some exemplary embodiments, the intermediate-level DAG may be prepared once for a quantum program, and provided to the second software compiler to be used as a basis for all remaining executions of the quantum program, without re-generating the intermediate-level DAG.

In some exemplary embodiments, the second software compiler may be configured to obtain the intermediate-level DAG from the first software compiler, and generate based thereon a quantum circuit, such as a gate-level DAG, for each execution of the quantum program. In some exemplary embodiments, the quantum circuit may comprise an executable quantum circuit, e.g., that can be handled by the quantum execution platform and executed thereby without further input from the compilation process modules.

In some exemplary embodiments, the compilation flow within the compilation architecture may correspond to the method of FIG. 5, and may be performed as follows. In some exemplary embodiments, the first software compiler may obtain a quantum program, such as a high-level quantum program that is not executable, and generate based thereon an initial DAG (also referred to as 'functional-level DAG'). In some exemplary embodiments, the initial DAG may comprise nodes that represents functionalities that the quantum program intends to implement in a quantum circuit, and edges between one or more nodes. For example, a functionality may be implementable by one or more quantum operations that are performed over at least two cycles. In some exemplary embodiments, the edges may indicate constraints of the nodes, such as input-output relationships between the nodes defining that an output of one functionality is used as an input of another functionality, precedence constraints defining which functionalities must be completed before other functionalities are invoked, or the like.

In some exemplary embodiments, after generating the initial DAG, the first software compiler may convert, or process, the initial DAG, to generate an intermediate-level DAG, including a processed version of the initial DAG that is partially compiled, that has gone through one or more compilation computations, or the like. For example, the intermediate-level DAG may comprise one or more partially or fully inlined nodes. In some exemplary embodiments, a fully inlined node may refer to a gate-level implementation of the node's functionality, e.g., an executable implementation of the node. In some exemplary embodiments, a gate-level implementation of a node may comprise two or more logical gates connected to two or more logical qubits. In some cases, a partially inlined node may refer to providing two or more alternative gate-level implementations of the node, each of which being executable. In some cases, a partially inlined node may refer to a node that is partially inlined, e.g., a node that has one or more gate-level implementations for a portion thereof. Such a node may not be executable. As another example, the intermediate-level DAG may comprise the initial DAG, without fully or partially inlined nodes, but with one or more associated computations. For example, a Constraint Satisfaction Problem (CSP) defining the possible implementations of the quantum program, may be processed to reduce parameter domains thereof, thereby reducing a computational load of the second software compiler.

In some exemplary embodiments, a quantum program may be implementable by a plurality of alternative gate-level implementations. In some cases, a functionality of the quantum program may have a plurality of viable alternative implementations that implement the same functionality as an executable logical quantum circuit that can be provided to the quantum execution platform. In some exemplary embodiments, each alternative gate-level implementation may implement the same functionality using a different set of logical gates, cycles and qubits, e.g., according to global hardware constraints of the quantum execution platform. In some exemplary embodiments, a tradeoff may exist between the number of qubits and the number of cycles that are used by a quantum circuit, e.g., since utilizing more qubits may reduce the number of cycles, thereby saving time, power, and computational resources. In some cases, additional details regarding how a quantum program can be implemented by a plurality of alternative gate-level implementations are disclosed in U.S. Patent Publication 2023/0,111,924, titled "Functional-Level Processing Component for Quantum Computers", published Apr. 13, 2023, which is hereby incorporated by reference in its entirety for all purposes without giving rise to disavowment.

In some exemplary embodiments, in order to generate the intermediate-level DAG, the first software compiler may take into account global constraints of the quantum execution platform, such as a total number of available gates of each type, a total number of available qubits, the connectivity architecture of qubits of the quantum execution platform, error mitigation steps that can be performed by the quantum execution platform, a flexibility of the provided implementations, or the like. For example, the first software compiler may obtain a total number of qubits available at a quantum execution platform and their connectivity architecture, and generate the intermediate-level DAG to comply with these constraints (e.g., such that no node utilizes more than the total number of qubits). In some cases, the global constraints may vary between hardware platforms since different platforms may have different resources, regardless of real-time constraints of each platform. In some cases, the first software compiler may take into account the fact that the real-time constraints are unknown, such as by selecting node implementations that are estimated to match different potential real-time constraints. For example, the first software compiler may consider or simulate multiple scenarios, edge cases, assumptions regarding the unknown constraints, probability distributions that can quantify the uncertainty associated with the constraints, or the like, and select node implementations that do not conflict with a greatest number of scenarios.

In some exemplary embodiments, in order to generate the intermediate-level DAG, the first software compiler may obtain one or more gate-level implementations from a library, dynamically synthesize gate-level implementations from scratch, dynamically synthesize gate-level implementations by combining one or more library instances, or the like. For example, one or more gate-level implementations of a node may be selected from synthesized instances of a pre-prepared library. As another example, a node may have twenty alternative implementations in an implementation library, and the first software compiler may select three implementations therefrom as matching most edge cases of real-time constraints, utilizing less resources than other implementations, or the like.

In some exemplary embodiments, the first software compiler may generate in advance multiple implementations of a node of the initial DAG, each implementation is useful for different real-time constraints, so that the second software compiler can select an implementation from the prepared implementations in real time based on the real-time constraints. In some exemplary embodiments, each implementation may utilize a different number of cycles, a different number of qubits, a different number of gates, a combination thereof, or the like.

In some exemplary embodiments, the first software compiler may generate, synthesize, or the like, in advance a single implementation of a node of the initial DAG, such as in case the first software compiler does not expect the real-time constraints to conflict with the implementation. In such cases, the second software compiler may be enabled to utilize the synthesized instance of the node without performing any calculation, CSP solving, or the like, with respect to the node. In some cases, the first software compiler may not generate in advance any implementation of a node of the initial DAG, e.g., in case the first software compiler estimates that a probability that the implementation will be useful is very low, e.g., below a threshold.

In some exemplary embodiments, the first software compiler may apply one or more optimizers, CSP solvers, or the like, in order to perform one or more compilation computations of an obtained quantum program. For example, a CSP problem may be defined over one or more parameters, constraints on domains of the parameters, or the like. For example, the global constraints of the quantum execution platform may be defined as constraints of the CSP problem. A CSP solver may be configured to detect one or more solutions to the CSP problem, each of which defining a viable implementation of the program. In such cases, instead of solving the CSP problem, the CSP solver may provide a partially solved solution, such as a reduced or simplified CSP problem that has a reduced domain of values for at least one parameter. In such cases, the intermediate-level DAG may or may not comprise fully or partially inlined nodes, and may be associated with the simplified CSP problem, which may then be provided to the second software compiler. For example, the intermediate-level DAG may comprise the initial DAG associated with the simplified CSP problem.

As an example, in case the CSP solver identifies that all solutions to the CSP problem must comprise a specific value of a parameter, the value may be determined to comprise a singleton value, and the domain of the parameter may be reduced, such that the simplified CSP problem comprises only the singleton value as the domain of the parameter.

In some cases, the first software compiler may determine one or more insights, such as based on the CSP solver. For example, the first software compiler may determine that instantiating two or more nodes together, as a composite instance, results with a more efficient circuit that utilizes less resources. For example, in case one node does not utilize auxiliary qubits, it may be advantageous to unify the node's implementation with a different node implementation, thereby obtaining a composite instance.

In such cases, the first software compiler may dynamically generate one or more composite instances for the nodes, utilize library instances to generate one or more composite instances for the nodes, or the like. For example, in case a first node has three alternative implementations in the library, and a second node has two alternative implementations in the library, six alternative composite instances may be generated (e.g., for all possible combinations of the first and second nodes). In other cases, a subset of the combinations may be generated and added to the library, e.g., based on priority scores assigned by an optimizer. In other cases, instead of generating the composite instances, the first software compiler may indicate to the second software compiler that the nodes should be instantiated to a composite instance, e.g., via metadata.

In some cases, the intermediate-level DAG may or may not be generated along with metadata, which may be linked or associated therewith. The metadata may be generated by the first software compiler, such as by deploying its CSP solver, and may be provided to the second software compiler, to assist it with its computations. For example, the metadata may indicate implementation suggestions such as a suggested order of implementing the DAG nodes (e.g., in case they have no restrictions between them, such as dependency constraints), ideal connectivity properties for one or more logical qubits, or the like. For example, in case the second software compiler attempts to schedule gate-level implementations of nodes A, B, and C, over a qubit-cycle space that has resources for executing only two of the nodes in parallel, the second software compiler may utilize metadata indicating that node A should ideally be implemented before node C, resulting with scheduling an execution of nodes A and B in parallel, and scheduling a subsequent execution of node C. In some exemplary embodiments, the first software compiler may provide the generated intermediate-level DAG, associated metadata, or the like, to the second software compiler.

In some exemplary embodiments, the second software compiler may obtain the intermediate-level DAG, and for each execution of the program (or set of executions), obtain real-time constraints on an availability of resources of the quantum execution platform. In some exemplary embodiments, the second software compiler may generate a quantum circuit that implements the intermediate-level DAG based on the real-time constraints obtained from the quantum execution platform.

In some exemplary embodiments, the quantum circuit may comprise a fully instantiated, or fully inlined, gate-level DAG, which may or may not be scheduled on a qubit-cycle space. For example, the quantum circuit may be allocated qubits, cycles, and gates for all of its functionalities. In some exemplary embodiments, the second software compiler may determine or select implementations for all the nodes of the intermediate-level DAG, resulting with a gate-level DAG that comprise a full gate-level implementation of each node or set of nodes in the DAG. For example, each gate-level implementation may comprise two or more logical gates connected to two or more logical qubits.

In some exemplary embodiments, in case the intermediate-level DAG provides a plurality of alternative implementations for a node, the second software compiler may select an implementation therefrom based on the real-time constraints. For example, in case one of the implementations can be executed in view of a number of idle qubits that are not currently used by the quantum execution platform, the second software compiler may select that implementation. As another example, in case two implementations can be currently executed in view of a number of idle qubits that are not currently used, the second software compiler may select an implementation based on heuristics, optimizers, predictors, priority scores of the implementations, a CSP solver, or the like.

In some exemplary embodiments, in case the intermediate-level DAG provides a single implementation for a node, the second software compiler may utilize the single implementation without further processing. In case the single implementation does not comply with the real-time constraints, such as utilizes more qubits than currently available, an execution of the node may be delayed, or alternatively, the second software compiler may re-compile the node according with the real-time constraints.

In some exemplary embodiments, in case the intermediate-level DAG provides a node without any implementations thereof, the second software compiler may compile the node from scratch, according with the real-time constraints. In one scenario, the intermediate-level DAG may comprise a first node that has no suggested implementation, a second node that has a single implementation, a third node that has multiple alternative implementations, or the like.

In some exemplary embodiments, the second software compiler may generate a quantum circuit by solving a second stage of a two-stage CSP problem. In some exemplary embodiments, at a first stage, a CSP problem corresponding to the quantum program and to global constraints of the quantum execution platform may be defined by the first software compiler, and a simplified CSP problem may be generated thereby. In some exemplary embodiments, at a second stage, the second software compiler may define a real-time simplified CSP problem, corresponding to the simplified CSP problem with added real-time constraints of the quantum execution platform. In some exemplary embodiments, the CSP solver may be executed twice; once by the first software compiler for generating the simplified CSP problem, and a second time by the second software compiler for generating the quantum circuit. In some exemplary embodiments, since the first software compiler may not have access to the real-time constraints, the second software compiler may adjust the simplified CSP problem to include the real-time constraints, such that the resulting quantum circuit complies with the real-time constraints. In some exemplary embodiments, the CSP solver may solve the simplified CSP problem, thereby selecting from the domain of each parameter of the simplified CSP problem a discreet value that defines a property of the quantum circuit. For example, in case the simplified CSP problem comprises a reduced domain of a parameter, the second software compiler may utilize the CSP solver to iterate over the reduced domains until reaching concrete values for all parameters that comply with all the constraints.

In some cases, the intermediate-level DAG may or may not comprise one or more portions that do not comply with the real-time constraints. In such cases, incompliant nodes may be scheduled to be delayed, until complying with the available resources, adjustments may be made, or the like. For example, the connectivity properties of available qubits may not correspond to the connectivity properties that were estimated by the intermediate-level DAG, requiring the second software compiler to adjust the swap chain, to change the allocation of physical qubits to logical qubits, to modify an implementation of the intermediate-level DAG, or the like.

In some exemplary embodiments, the generation of the initial DAG and its conversion to an intermediate-level DAG may constitute a computational effort, and may be performed once, or another small number of times for a quantum program, while the generation of the gate-level DAG may be performed multiple times, e.g., for every execution of the program. In some exemplary embodiments, the intermediate-level DAG may be generated only once, although the program may be executed a plurality of times, e.g., a thousand times. In some exemplary embodiments, the second software compiler may generate a different quantum circuit for each execution of the program, of a portion thereof, according to the respective real-time constraints. In some exemplary embodiments, since the real-time constraints may be specific to the point in time of each execution, different real-time constraints may be obtained at different execution times of the same program, resulting with different quantum circuits.

In some exemplary embodiments, since the second software compiler may not be required to perform a full compilation of the quantum program, but instead to merely complete a compilation of the intermediate-level DAG, the compilation time of the second software compiler may be low, e.g., less than a time threshold. For example, instead of synthesizing an implementation of a node, the second software compiler may be merely required to select an implementation that is already synthesized by the first software compiler. In some exemplary embodiments, the intermediate-level DAG may reduce a computational burden of the second software compiler, and enable the second software compiler to generate a quantum circuit swiftly, e.g., within a defined time delay.

Figure 3:
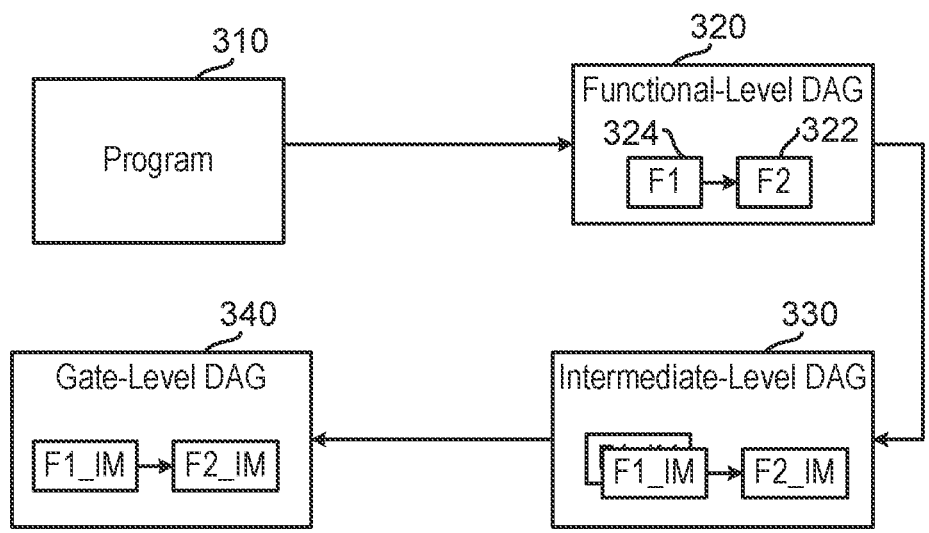
FIG. 3 shows an exemplary compilation process, in accordance with some exemplary embodiments of the disclosed subject matter.
Figure 3:
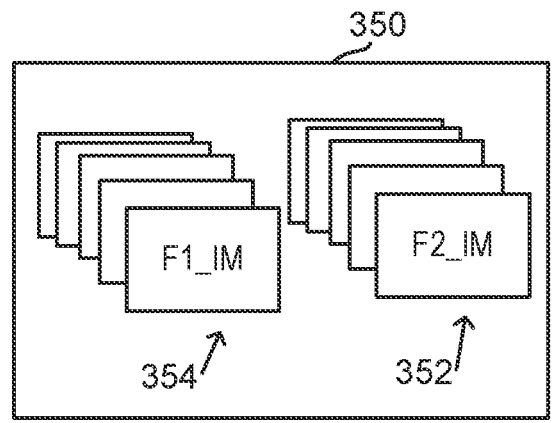

Referring now to FIG. 3, showing an exemplary compilation process, in accordance with some exemplary embodiments of the disclosed subject matter.

In some exemplary embodiments, a quantum program such as Program 310 may be obtained, e.g., from a user, a server, a network, or the like. In some exemplary embodiments, Program 310 may comprise a high-level quantum program with a plurality of quantum operations, functions, or the like. In some exemplary embodiments, Program 310 may be provided to the first software compiler, which may generate Functional-Level DAG 320 based on Program 310. For example, Functional-Level DAG 320 may represent one or more functionalities or operations of Program 310 as nodes, and relationships between the functionalities as edges. In one scenario, Program 310 may comprise at least two functionalities, denoted F1 and F2, which may have a precedence relationship between them. For example, the output of F1 may be utilized as an input of F2. In this scenario, Functional-Level DAG 320 may be generated to comprise a first Node 324 representing F1, a second Node 322 representing F2, and an edge between them representing the dependency of F2 on an output of F1.

In some exemplary embodiments, based on Functional-Level DAG 320, and on global hardware constraints of a quantum execution platform, the first software compiler may generate Intermediate-Level DAG 330, which may comprise a partially compiled version of Functional-Level DAG 320. For example, Intermediate-Level DAG 330 may comprise a selection of two alternative gate-level implementations for the first Node 324, and a single implementation for the second Node 322. In other cases, Intermediate-Level DAG 330 may comprise a node for which no implementations are selected (not depicted). In other cases, Intermediate-Level DAG 330 may comprise an instantiation of two or more combined nodes (not depicted). In other cases, Intermediate-Level DAG 330 may comprise Functional-Level DAG 320 with a corresponding simplified CSP problem, calculated by the first software compiler.

In some exemplary embodiments, the first software compiler may generate implementations of one or more nodes by selecting them from a Library 350, by dynamically synthesizing them, or the like. For example, Library 350 may comprise a plurality of implementations of F1, e.g., Implementations 354, and a plurality of implementations of F2, e.g., Implementations 352. In some cases, the implementations may be generated by combining one or more records from Library 350. In some cases, the implementations may be dynamically generated by the first software compiler and added to Library 350.

In some exemplary embodiments, Intermediate-Level DAG 330 may be provided to the second software compiler, which may have access to real-time constraints on an availability of resources of a quantum execution platform (e.g., via a communication channel). In some exemplary embodiments, based on Intermediate-Level DAG 330 and the real-time constraints, the second software compiler may generate Gate-Level DAG 340. In some exemplary embodiments, Gate-Level DAG 340 may comprise a quantum circuit that includes a single implementation for each node, set of nodes, or the like. For example, Gate-Level DAG 340 may comprise a single implementation for the first Node 324 representing F1, and a single implementation for the second Node 322 representing F2. In some cases, Gate-Level DAG 340 may be executable by the quantum execution platform, and may comprise a temporal relationship between the nodes, qubit and cycle allocations, or the like.

In some exemplary embodiments, the Gate-Level DAG 340 may be provided to the hardware compiler of the quantum execution platform, for execution thereon. In some exemplary embodiments, in case metadata is generated for Gate-Level DAG 340, Gate-Level DAG 340 may be provided to the hardware compiler along with the metadata, and the hardware compiler may compile and execute a respective quantum circuit while taking into account the metadata. For example, the metadata may be provided as a separate file, as part of Gate-Level DAG 340, or the like.

One technical effect obtained by the disclosed subject matter is enabling to compile a quantum program according to real-time constraints of the quantum execution platform, which reduces an overall amount of resources used by a quantum execution platform when executing a set of one or more quantum programs, and enhances a quality of the resulting quantum states.

Another technical effect obtained by the disclosed subject matter is introducing a compilation architecture that distributes the computational load of the compilation between the first software compiler, which has no access to the real-time constraints, and between the second software compiler, which has access to the real-time constraints, thereby achieving a balance between an efficiency of the resulting quantum circuit (e.g., taking into account the real-time constraints), and between the time delay and computational resources that are required for generating each quantum circuit. In some exemplary embodiments, the quantum programs are converted to gate-level DAGs, and the gate-level DAGs are synthesized to quantum circuits that take into account real-time constraints of the quantum execution platform every execution. This architecture may be enabled to generate gate-level DAGs once, regardless of the real-time constraints, in order to reduce a computational load of the second software compiler, which reduces, respectively, the latency of the second software compiler. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Yet another technical problem dealt with by the disclosed subject matter is how to enhance a load division between the classical computational units, e.g., the first and second software compilers.

In some exemplary embodiments, a tradeoff may exist between performing computations (e.g., applying CSP solvers) at the first software compiler and performing computations at the second software compiler. In some exemplary embodiments, as more computations are performed at the first software compiler, the computational burden of the second software compiler may be linearly reduced, resulting with a smaller compilation delay (e.g., less than a threshold), but the resulting gate-level DAG may not match as well to the real-time constraints. In some exemplary embodiments, as more computations are performed at the second software compiler, the resulting gate-level DAG may be more efficient and take the real-time constraints better into consideration, at the expense of a larger computational burden and compilation delay. In some exemplary embodiments, as more computations are performed by the second software compiler, generating the gate-level DAG at the second software compiler for every execution of the program may become more expensive resource-wise, may increase a compilation time of each quantum circuit, and may increase as the computational load on the second software compiler. It may be desired to identify an optimal balance of the computational distribution.

One technical solution provided by the disclosed subject matter is dynamically determining, or selecting, a distribution of computations between the first and second software compilers, based on one or more parameters. In some exemplary embodiments, the distribution may indicate, for each computation of a plurality of computations, whether the computation should be performed at the first software compiler or at the second software compiler.

In some cases, some computations may be assigned by default to one of the first and second software compilers, while others may be dynamically assigned to one of the first and second software compilers. For example, parsing the quantum program may be assigned by default to the first software compiler, and not to the second software compiler. In some exemplary embodiments, computations that are not assigned by default to one of the first and second software compilers may be dynamically assigned, e.g., as described below.

In some exemplary embodiments, the plurality of computations that can be dynamically assigned to the first or second software compiler, may comprise selecting implementations for non-executable nodes of a DAG. For example, non-executable nodes may comprise functional blocks, high-level components of DAG nodes, nodes of the initial DAG, or the like. In some exemplary embodiments, the computations may comprise synthesizing a logical quantum circuit representing the quantum program or portions thereof. In some exemplary embodiments, the computations may comprise assigning logical qubits, such as dirty or clean auxiliary qubits, to circuit components. In some exemplary embodiments, the computations may comprise determining, for an auxiliary qubit that is utilized by the quantum program, whether to uncompute or reset the qubit, reset the qubit, or keep it as garbage. In some exemplary embodiments, the computations may comprise generating metadata, such metadata indicating an advantageous order between circuit components, e.g., between nodes of the gate-level DAG, in case the order between the components is not limited by a constraint. In some exemplary embodiments, the computations may comprise selecting a routing, or mapping, of physical qubits to logical qubits. In some exemplary embodiments, the computations may comprise applying one or more optimizations on one or more DAG levels, such as by applying pattern-matching algorithms, identifying gate cancelations, or the like. In some exemplary embodiments, the computations may comprise generating a Quantum Error Correction (QEC) assignment, during which one or more sets of physical qubits are grouped as part of a QEC scheme to represent one or more logical qubits, e.g., using surface code techniques. For example, a QEC assignment may correspond to one or more error correction schemes disclosed in U.S. patent application Ser. No. 17/723,561, titled "DETERMINING DYNAMIC QUANTUM ERROR CORRECTION SCHEMES", filed Apr. 19, 2022, which is hereby incorporated by reference in its entirety for all purposes without giving rise to disavowment. In some exemplary embodiments, the computations may comprise selecting a QEC scheme, selecting cycles for applying each QEC scheme, selecting assignments of physical qubits to logical qubits for a QEC scheme, mapping logical qubits to QEC qubits, or the like, e.g., dynamically, statically, or the like. In some exemplary embodiments, the computations may comprise selecting swap chain implementations.

In some exemplary embodiments, the computation assignment may be disjoint, such that no assignment is performed by both software compilers. In some exemplary embodiments, one or more computations of a same type may be assigned to both the first and second software compilers, such as with respect to a different circuit component. For example, the first software compiler may be assigned to synthesize a first node of an initial DAG, and the second software compiler may be assigned to synthesize a second node of an initial DAG. In some cases, in certain scenarios, such as in case that a computation performed by the first software compiler contradicts the real-time constraints, or cannot be executed, the second software compiler may re-perform the same computation to match the real-time constraints. In some cases, one or more computations may not be assigned to the first software compiler nor to the second software compiler, such as in case that the computation is configured to be performed by the quantum execution platform, e.g., in accordance to the method of FIGS. 8A-8B.

In some exemplary embodiments, a distribution of computations between the first and second software compilers may be determined based on one or more parameters, rules, or the like. For example, the allocation of computations may depend on a number of times that the program is set to be executed on the quantum execution platform. In some cases, the allocation of computations may depend on the number of classical processing units that are available, and a cost function of classical computations. In some cases, the allocation of computations may depend on a number of quantum resources that are available, such as available resources of a quantum computing cloud, and a cost function of quantum resources. In some cases, the allocation of computations may depend on an estimated cost of implementing the selected distribution, and an estimated utility from implementing the selected distribution. For example, in case the delta, or offset, between the estimated utility from the distribution and its cost is lesser than a threshold, the distribution may not be implemented. In such cases, a default distribution may be utilized, a previous distribution may be utilized, a different distribution may be selected, or the like. In some exemplary embodiments, the allocation of computations may depend on specifics of the quantum program, e.g., resources that are required for executing the quantum program.

In some exemplary embodiments, a distribution of computations for a quantum program may be determined once, for the quantum program, and utilized again for each execution of the respective quantum circuit. For example, for each execution of the quantum program, the second software compiler may perform computations allocated to it by the distribution, over the intermediate-level DAG that was generated by the first software compiler. In other cases, during executions of a same quantum program, the distribution of computations may be dynamically adjusted, such as in case that adjusting the distribution is estimated to enhance the compilation process. For example, in one scenario, the computational load of processing a quantum program may be split in a different manner between the first and second software compilers for different batches of one or more executions.

In some exemplary embodiments, a distribution of computations may be determined using one or more predictors, optimizers, CSP solvers, machine learning predictors, or the like. For example, a machine learning module may be trained on various distributions that are used for compiling a quantum program, according to a cost function that assigns a cost for using resources, for idle qubits, for reducing an accuracy of an output state, or the like. According to this example, the machine learning module may be trained to predict, for a newly obtained quantum program, which distribution will result with a lowest overall cost of the cost function. In some exemplary embodiments, the computations themselves that are assigned by the distribution may be determined one or more predictors, optimizers, CSP solvers, machine learning predictors, or the like. For example, an optimizer (e.g., machine learning module) may be utilized to determine how many implementations a software compiler should provide for a node, which calculations to perform when selecting an implementation for a node, or the like.

Figure 6:
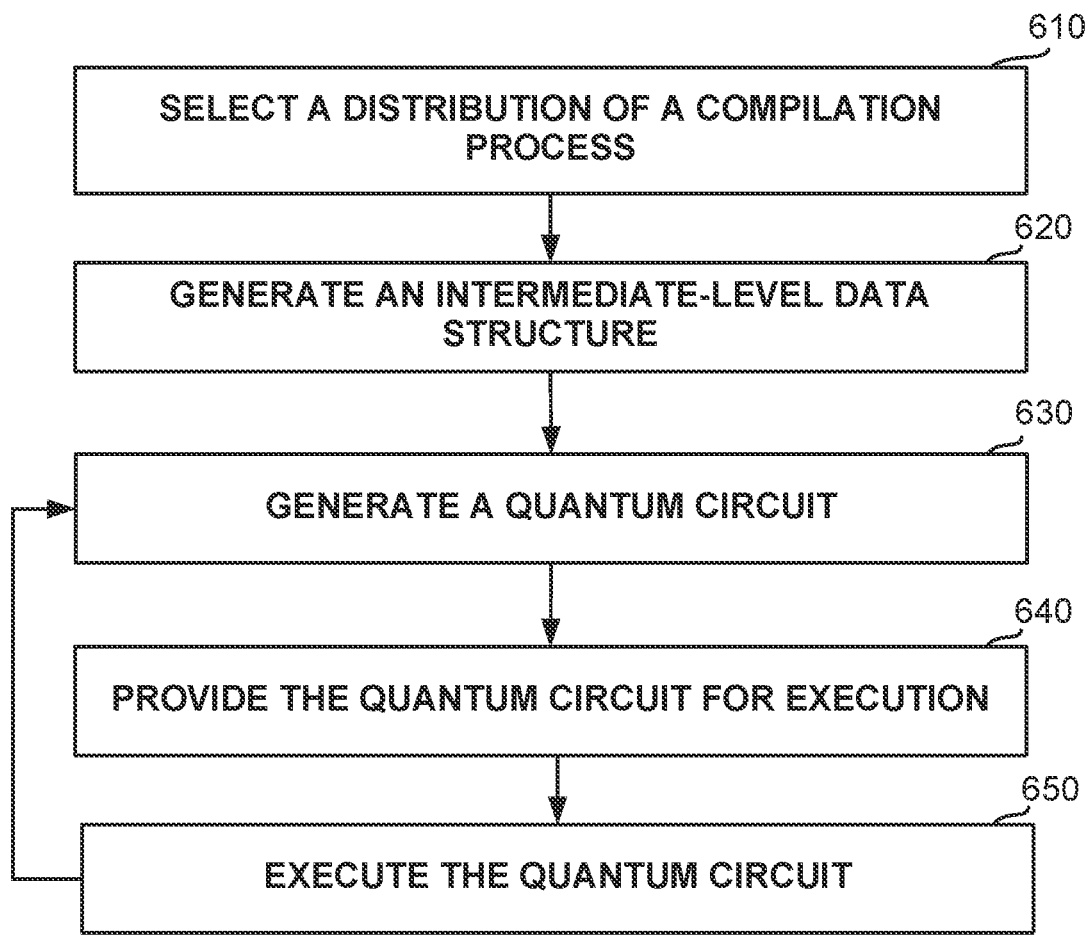
FIG. 6 shows an exemplary flowchart diagram of a method, in accordance with some exemplary embodiments of the disclosed subject matter.

In some exemplary embodiments, a compilation process of a quantum program, using the dynamically calculated distribution of computations, may correspond to the steps of FIG. 6.

One technical effect obtained by the disclosed subject matter is enabling to dynamically distribute the computational load of compilation between the first and second software compilers, for every quantum program. In some exemplary embodiments, this enables to reduce an overall computational load of the first and second software compilers. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

It is noted that when the disclosed subject matter recites the term 'cycle', throughout this application, the disclosed subject matter is not limited to a physical cycle. In some cases, physical cycles may relate to quantum cycles that are physically allocated to a quantum circuit by a hardware compiler for execution on a quantum execution platform. Any mentioning of the term 'cycle' in association with a different compilation stage (e.g., not performed by the hardware compiler) may refer to logic cycles and not to physical cycles. In this context, logical cycles may refer to abstract stages, or a defined order between operations, as opposed to referring to a specified cycle (e.g., physical cycle number 473). For example, mentioning a cycle in the context of a DAG data structure may refer to an order between quantum gates, which may constitute a logical cycle and not a physical cycle. According to this example, during a subsequent hardware compilation stage, the hardware compiler may or may not comply with an order indicated by the logical cycles.

Yet another technical problem dealt with by the disclosed subject matter is how to enhance a communication between the software compilation modules and the quantum execution platform. In some cases, a quantum program may be compiled according to real-time constraints, such as according to the method of FIG. 5, but the real-time constraints may change unexpectedly after the compilation of the program, making the quantum circuit suboptimal. It may be desired to overcome such drawbacks.

One technical solution provided by the disclosed subject matter is to perform the compilation process and the execution process iteratively, instead of compiling an entire program and then executing the resulting quantum circuit. In some exemplary embodiments, at each iteration, a different portion of the quantum program may be compiled and executed, thereby increasing a compatibility of the compilation with the real-time constraints, and reducing the probability that an unexpected change in the real-time constraints will reduce the performance of the execution. In some exemplary embodiments, the iterative compilation and execution processes may correspond to the steps of FIG. 7.

In some cases, instead of compiling a quantum program to a respective quantum circuit, and executing the quantum circuit, software compilation modules (e.g., the compiler and transpiler of FIG. 1, the first and second software compilers of FIG. 5) may compile portions of the quantum program, iteratively, and communicate with the quantum execution platform between each iteration. In some cases, the software compilation modules may belong to a quantum operating system of the quantum execution platform (e.g., the quantum operating system of FIGS. 8A-8B), and may communicate with its processing module. For example, in the scenario of FIG. 5, the second software compiler may provide a gate-level DAG to the quantum execution platform in one or more iterations by providing one or more nodes of the gate-level DAG at a time.

In some exemplary embodiments, between each iteration, the software compilation modules may obtain one or more real-time constraints from the quantum execution platform, one or more upper bounds of the quantum execution platform, one or more metadata from the quantum execution platform, or the like. In some exemplary embodiments, based on obtained data from the quantum execution platform, a next portion of the quantum circuit may be compiled and provided for execution.

In some cases, one or more software compilers may negotiate with the quantum execution platform using one or more back and forth communication iterations. For example, a transpiler (e.g., or the second software compiler of FIG. 5) may indicate to the quantum execution platform that one or more resources are required for an execution, and the quantum execution platform may respond by indicating an upper limit of resources it can provide to the execution. In some exemplary embodiments, based on the upper limit, the transpiler may compile the quantum program to a quantum circuit that complies with the upper limit of resources.

One technical effect obtained by the disclosed subject matter is enabling to execute programs in a more accurate manner, while matching the compilation process to any unexpected changes in the availability of resources of the quantum execution platforms. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Yet another technical problem dealt with by the disclosed subject matter is to manage qubit and cycle allocations in a more efficient manner, such as in order to reduce a number of qubits that are idle during one or more cycles, to reduce a number of cycles during which a qubit is idle, or the like.

In some cases, utilizing qubits efficiently may reduce an execution time, and reduce an error rate caused by long execution times.

Yet another technical problem dealt with by the disclosed subject matter is to enhance a load division between the classical computational units, e.g., the software compiler and transpiler of FIG. 1, the first and second software compilers of FIG. 3, or the like, and between the quantum execution platform. For example, it may be desired to reduce an overall execution effort and time of both classical and quantum modules, such as by balancing the computational load in an efficient manner.

One technical solution provided by the disclosed subject matter is to distribute the management of qubits to a quantum operating system that is associated with the quantum execution platform. In some exemplary embodiments, the quantum operating system may constitute an operating system of a quantum execution platform, and may comprise a hardware compiler (e.g., of the quantum execution platform), a qubit pool, a qubit management module for managing the qubit pool, other computations modules, or the like. In some exemplary embodiments, the quantum operating system may comprise a processing module of the quantum execution platform, e.g., stored within a hardware compiler thereof, externally of the hardware compiler, a combination thereof, or the like. For example, the processing module may be stored at least partially within the quantum execution platform, stored in association with the quantum execution platform, or the like. In some exemplary embodiments, the processing module may comprise at least the qubit pool and the qubit management module for managing the qubit pool. In some exemplary embodiments, the processing module may comprise one or more classical computation modules, quantum computation modules, a combination thereof, or the like. In some cases, the processing module, alone or in combination with adjusted software modules, such as an adjusted version of the initial and/or second software compilers of FIG. 3, an adjusted version of software compilers and/or transpilers of FIG. 1, or the like, may constitute in practice a global operating system of the quantum execution platform, that is not limited to managing an execution of a single quantum circuit. In some exemplary embodiments, the quantum operating system may be configured to manage executions of a plurality of quantum circuits that may or may not be executed in parallel, with one or more overlapping cycles, sequentially, or the like.

In some exemplary embodiments, the processing module of the quantum operating system may be configured to maintain a qubit pool with available auxiliary qubits, available non-auxiliary qubits, or the like. For example, for every qubit that is represented by the qubit pool, a respective status of the qubit may be maintained, e.g., whether or not the qubit is a clean auxiliary qubit, a dirty auxiliary qubit (in an unknown state), a clean non-auxiliary qubit, or the like. For example, the qubit pool may indicate that a qubit has a known pure state. As another example, the qubit pool may indicate that a qubit is a dirty qubit in a disentangled unknown state. As another example, the qubit pool may indicate that a qubit is a dirty qubit in an entangled unknown state. In some exemplary embodiments, the qubit pool may be utilized for a plurality of quantum circuits that are being executed by the quantum execution platform.

It is noted that when relating to the qubit pool, operations associated therewith such as adding thereto qubits, or maintaining therein qubits, should not be interpreted physically, at least since the qubits are not physically moved. Instead, such operations relate to calculations performed by the quantum operating system in order to monitor which qubits are available, which qubits should be processed and allocated to a program, or the like.

In some exemplary embodiments, auxiliary qubits may be available for use by a circuit as temporary workspace, and may be clean or dirty. In some exemplary embodiments, in case auxiliary qubits are initialized to a known computational basis state such as the ground state (e.g., the |0>state), they may be referred to as 'clean' auxiliary qubits. In some exemplary embodiments, in case auxiliary qubits are retained in an unknown and potentially entangled state with other parts of the quantum processor's memory, they may be referred to as 'dirty' auxiliary qubits.

In some exemplary embodiments, dirty qubits may or may not be immediately available for usage of a requesting program, and in some cases the requesting program may be required to restore dirty qubits to the dirty state in the qubits are obtained, before releasing the dirty qubits from the requesting program. For example, in case a dirty qubit is obtained in a first unknown quantum state, the qubit may be reused by a program, during which the qubit may be set with a second quantum state. According to this example, the program may be required to release the qubit in the same first unknown quantum state. In some exemplary embodiments, clean qubits may be more valuable, in resource utilization terms, than dirty ones, as they allow for simpler and more compact circuit constructions. In some exemplary embodiments, dirty qubits may be more plentiful, since any temporarily unused qubit can be referred to as a borrowable dirty qubit.

In some exemplary embodiments, the qubit pool may be managed by the processing module of the quantum operating system, and may be used to assign available qubits from the qubit pool for gates, quantum operations, or the like, of quantum circuits. In some exemplary embodiments, qubits from the qubit pool that may be available to be allocated to programs may comprise dirty or clean non-auxiliary qubits, dirty or clean auxiliary qubits, or the like. In some exemplary embodiments, qubits from the qubit pool may be assigned to quantum programs as part of a hardware compilation process of the quantum programs. For example, the hardware compilation process may be configured to process an obtained quantum circuit and potentially adjust it according to one or more constraints, e.g., hardware constraints of the quantum execution platform that may not be complied with by the quantum circuit, hardware constraints that may not be known to the software compilation modules, or the like. For example, the quantum execution platform may not enable to execute more than ten gates at a single physical cycle, and may be configured to adjust any obtained quantum circuit to comply with this limit, such as by delaying executions of some gate operations. As another example, the quantum execution platform may not have a sufficient quantity of gates, at a specific physical cycle, for executing a program. In such cases, a logical gate of the program may be selected, given it is not on the critical path of the program, on the least critical path, or the like, and the implementation of the selected logical gate may be postponed without necessarily inducing subsequent execution delays.

In some exemplary embodiments, the quantum operating system may manage a same qubit pool for all executed or scheduled programs, quantum circuits, or the like, which are executed or scheduled to be executed on the quantum execution platform, thereby enabling cross-program sharing of resources. For example, a qubit may be re-used by different circuits that are executed simultaneously, sequentially, or the like. In some exemplary embodiments, an instance composed of n programs (n>1) may share one or more qubits between the programs, between program portions, or the like. For example, a qubit may be allocated to one program in one timeframe, and when released, may be allocated to a different program. In some exemplary embodiments, the quantum operating system may allocate qubits to one or more programs according to a real-time availability of qubits in the qubit pool, according to one or more optimizations, cost functions, or the like.

In some exemplary embodiments, the hardware compilation process may be adjusted to include qubit management operations, such as allocating qubits to programs, releasing qubits from programs, setting qubits to quantum states requested by programs, or the like. For example, software compilation modules that are associated with the quantum operating system may incorporate into compiled programs qubit allocation instructions to request one or more qubits, and qubit release instructions to release one or more qubits. In some cases, incorporating such instructions may render a resulting quantum circuit inexecutable, e.g., until a hardware compilation is performed. For example, the processing module of the quantum operating system may be configured to allocate and release qubits according to the incorporated instructions, thereby performing a hardware compilation. In some exemplary embodiments, distributing all the qubit assignments and releases to a central entity such as the processing module of the quantum execution platform, may reduce the computational burden of the software compilation modules, and enhance an efficiency of the qubit allocation and release processes.

In some exemplary embodiments, software compilation modules may be configured to generate quantum circuits in a manner that enhances the flexibility and efficiency of an external management of the qubit pool (by the processing module of the quantum operating system). For example, quantum circuits may be generated to exclude any assignments of qubits, to exclude reuse operations of auxiliary or non-auxiliary qubits, to retain or increase gaps during which a qubit is idle, to exclude setting portions that are configured to set a qubit with a desired quantum state, to exclude cleaning portions, or the like. In some exemplary embodiments, instead of specifying usages and reuses of qubits, the software compilation modules may incorporate requests for obtaining and releasing a number and/or type of unspecified qubits. For example, instead of obtaining from software modules specifications of logical qubits for applying thereon quantum operations, quantum operations for releasing or reusing qubits, or the like, the software compilation modules may merely incorporate requests for one or more types of qubits at one or more cycles, for one or more operations, or the like, e.g., via a qubit allocation instruction. For example, the software modules may incorporate a qubit allocation instruction to request two qubits with one or more properties (e.g., clean, dirty unknown state, entangled state, disentangled state, a combination thereof, or the like) for a specific gate operation in the quantum circuit occurring at a specified cycle. In some cases, a qubit allocation instruction may correspond to the C library function 'malloc' in classical computing, which allocates requested memory and returns a pointer to it. In some exemplary embodiments, the instructions may be incorporated in a quantum circuit as part of a compilation process of the software modules, e.g., as described in the method of FIG. 8B.

In some exemplary embodiments, the quantum circuits may be generated to indicate, at an earliest stage as possible, when qubits can be released from their program. For example, qubits may be instructed to be released, via a qubit release instruction, before the execution of a program is completed, such as when the qubit is no longer needed for the remaining program. According to this example, a qubit may be instructed to be released after a certain gate operation is performed, e.g., in case the qubit is not needed for the remaining program after the gate operation. In some exemplary embodiments, this may enable subsequent programs to make use of the released qubits at an earliest stage as possible. For example, an auxiliary qubit released by one program may be used by another, as the sharing of qubits may be cross-program via the qubit pool. In some exemplary embodiments, when qubits are released as soon as possible, the qubits become available at different uneven times, as may be indicated by real-time constraints of the quantum execution platform.

In some exemplary embodiments, the processing module of the quantum operating system may be configured to execute (or configure for execution) one or more quantum circuits according to their incorporated qubit allocation instructions, qubit release instructions, or the like. In some exemplary embodiments, qubit allocation instructions may request to obtain a qubit register at a specific or gate of the quantum circuit, and potentially having a specific quantum state. For example, qubit allocation instructions of a program may instruct the processing module to provide it with a qubit at a disentangled state, e.g., dirty or clean. As another example, qubit allocation instructions may instruct the processing module to provide the program with a clean qubit, e.g., having a known pure state, being set to zero or ground state, or the like. As another example, qubit allocation instructions may instruct the processing module to provide the program with a qubit that has a desired quantum property, without further requirements. For example, a qubit allocation instruction may request a qubit in a highly entangled state with some level of entanglement. As another example, a qubit allocation instruction may request a qubit in a quantum state with given amplitudes for a specified computational basis states, with random phases. In some exemplary embodiments, qubit release instructions may request to release a qubit register at a specific cycle, after a specified gate, or the like.

In some exemplary embodiments, the processing module of the quantum operating system may obtain a program with a qubit allocation instruction, and allocate to the program respective qubits from the qubit pool. In some exemplary embodiments, the processing module may select a qubit from the qubit pool based on one or more calculations, metrics, or the like, e.g., instead of randomly selecting qubits from the qubit pool, or instead of selecting qubits according to their connectivity property. In some exemplary embodiments, the processing module may select a qubit from the qubit pool based on a number of resources that are estimated to be required for setting each qubit with the requested quantum state. For example, in case the qubit allocation instruction requests a clean qubit in a zero state, the processing module may select a qubit from the qubit pool that is already clean, or that can be cleaned easily, e.g., using a small number of resources. As another example, in case the qubit allocation instruction requests a clean qubit in a specified non-zero state, the processing module may select a qubit from the qubit pool that is has a similar quantum state, thus requiring a small number of adjustments to obtain the quantum state.

In some exemplary embodiments, the processing module of the quantum operating system may obtain a program with a qubit release instruction, and accordingly release respective qubits from the program. In some exemplary embodiments, the processing module may be configured to release qubits from a program in one or more states. In some exemplary embodiments, a program may release a qubit register (e.g., comprising one or more qubits) in a 'clean' state, in which the qubit register has a known pure state. In some exemplary embodiments, clean qubits may be released in a zero or ground state, or in any other known state. In some exemplary embodiments, a program may release a dirty qubit register in a 'dirty state', in which the qubit register has an unknown state that may or may not be disentangled with the releasing program, with any qubits of the releasing program, or the like.

In some cases, the state of a released qubit may be indicated by the releasing program to the processing module via a qubit release instruction, or via any other signal. In some cases, the state of a released qubit may be indicated by the software compilation modules to the processing module, such as via metadata, signals, packets, or the like. In some cases, the state of a released qubit may be determined independently by the processing module, e.g., by analyzing the releasing program and operations that were applied thereby on the released qubit.

In some cases, the processing module of the quantum operating system may be configured to process quantum states of released qubits before adding them to the qubit pool, such as by applying one or more cleaning operations of the qubit. In some cases, the processing module may be configured to maintain quantum states of released qubits, and add them unchanged to the qubit pool without further processing. In some cases, the processing module may determine whether or not to process a released qubit, such as based on requirements of subsequent programs, a number of available quantum resources, or the like. In some cases, the processing module may determine when to process a released qubit, such as prior to adding the released qubit to the qubit pool, prior to allocating the qubit to a subsequent program, or the like.

In one scenario, the processing module of the quantum operating system may obtain a qubit release instruction to release a clean qubit from a program, and process the qubit register to set its state to zero, to set its state to another quantum state, or the like. For example, the processing module may set the state of the qubit register to a quantum state that is requested by another program. As another example, the processing module may obtain a qubit release instruction to release a clean qubit register having a known pure state, and may add the qubit register to the qubit pool with no further processing. In such cases, the qubit register may be provided to a subsequent program in its released state, enabling the subsequent program to set the qubit register's state, to utilize the qubit with its obtained state as a dirty disentangled state, or the like.

In another scenario, the processing module may obtain a qubit release instruction to release a qubit in a dirty disentangled state from a program. For example, the qubit's state may or may not be correlated with a quantum state of the releasing program. In some cases, the processing module may or may not process the qubit register before providing it to a subsequent program. In case the dirty qubit is needed by a future portion of the releasing program, the processing module may not process the qubit's state. In such cases, the processing module may provide the qubit register, in its dirty disentangled state, to a different program, enabling the program to utilize the qubit as a 'dirty' qubit with an unknown state, on the condition that the program will restore the qubit's dirty state before releasing the qubit. In other cases, the processing module may be responsible for restoring the qubit's dirty state, thus reducing the load of the requesting program.

In yet another scenario, the processing module may obtain a qubit release instruction to release a qubit register in a dirty entangled state, e.g., which may be entangled with the releasing program. In some cases, the processing module may or may not process the qubit register, and the qubit register may be provided only to a requesting program that is different from the releasing program (with which the qubit is entangled). In some cases, instead of processing the qubit register, the processing module may provide the qubit register, in its dirty entangled state, to a different program that is not the releasing program, enabling the requesting program to utilize the qubit as a dirty qubit, as long as the program restores the qubit's dirty state before releasing the qubit. In other cases, the processing module may be responsible for restoring the qubit's dirty state.

According to this scenario, in some cases, the processing module of the quantum operating system may provide, from the qubit pool, a released qubit to a quantum program, even in case that the qubit is entangled with the same quantum program. For example, this may be performed in case the entangled program keeps track of all qubits that can potentially be entangled with the released qubit, and ensures to adjust its calculations accordingly. For example, the program may not apply shared operations on the released qubit and on a qubit that may be entangled therewith. In some cases, as a default, it may be advantageous that the processing module will not provide entangled qubits to a program with which it is entangled, such as in order to reduce a probability of disrupting the program's functionality.

In some exemplary embodiments, after providing a dirty entangled qubit from a releasing program to a subsequent program, the processing module may ensure not to provide any other dirty entangled qubits from the releasing program to the subsequent program. For example, program A may release a qubit in a dirty entangled state, and program B may obtain the released dirty entangled qubit. According to this example, in case a second dirty entangled qubit is released by program A, the second qubit may not be provided to program B, at least since the first and second released qubits may be entangled with each other within program B. In some exemplary embodiments, any subsequent programs, such as programs C1-Cn that obtain dirty entangled qubits from program B, may also be entangled with qubits of program A. Thus, the processing module may not provide released qubits from the subsequent programs C1-Cn to program A, or between each other. An exception may be a case in which a subsequent programs Cn does not include qubit allocation instructions that request dirty entangled qubits. In such cases, the processing module may provide released qubits from the subsequent program Cn to program A.

In some exemplary embodiments, the quantum circuits may be generated to be absent of any qubit management operations. In some exemplary embodiments, instead of each program managing its own auxiliary qubits, the processing module of the quantum operating system may centrally manage a qubit pool for all programs, while taking into account all programs that are scheduled to be executed thereby. In some exemplary embodiments, refraining from managing qubits within the quantum circuits may increase the ability of the processing module to manage the qubit pool efficiently. For example, the quantum circuits may be generated to not reuse dirty qubits, such as dirty auxiliary qubits, regardless of whether or not they are idle. In some exemplary embodiments, this may enable the processing module to determine optimized re-usages of dirty qubits, while taking into account all circuits that are being executed, or are scheduled for execution. For example, the processing module, acting as an operating system, may assign a dirty qubit that is idle for a certain period of time, to be used for a different program, a different portion of the program, or the like, before returning the dirty qubits to its previous quantum state.

In some exemplary embodiments, the processing module of the quantum operating system may obtain a compiled quantum circuit, and allocate qubits to an execution of the circuit according to an availability of qubits in the qubit pool, one or more optimizations, metadata, a combination thereof, or the like. For example, the processing module may manage the qubit allocations and releases according to the method of FIG. 8A.

In some cases, software compilation modules may, in some cases, provide metadata to the processing module that provides suggestions for qubit allocations and/or releases. The suggestions may comprise non-binding suggestions, binding requests, or the like. For example, a transpiler may indicate to the processing module that, when allocating physical qubits to first and second logical qubits, it may be advantageous to select first and second physical qubits that have a certain connectivity relationship (e.g., are directly connected), if possible. For example, such suggestions may be incorporated within the respective qubit allocation instructions. In some exemplary embodiments, the processing module may or may not comply with the obtained metadata, e.g., based on constraints, insufficient resource availability, or the like. For example, the processing module may assign physical qubits with the requested connectivity property to logical qubits of the circuit, in case the qubit pool comprises such qubits and they are not needed for other executions. As another example, the processing module may not assign physical qubits with the requested connectivity property to logical qubits of the circuit, in case that an optimization analysis of the processing module indicates that allocating the physical qubits differently will optimize the execution of the circuit.

In some exemplary embodiments, a quantum circuit may be generated to retain or increase gaps in a usage of a qubit, during which the qubit is idle, thereby enabling the processing module to perform one or more optimizations using the qubit pool. In some exemplary embodiments, a gap may be increased by delaying certain quantum operation, changing one or more timings, instructing to release a qubit early, or the like. In some exemplary embodiments, gaps of qubits (e.g., auxiliary qubits, input qubits, output qubits, or any other non-auxiliary qubit), may be utilized by the processing module for performing one or more error mitigation operations, error resilience operations, quality increasing operations, or the like. In some exemplary embodiments, error mitigation operations may be configured to increase a quality of qubits (e.g., by decreasing their error rate) using one or more quantum gates.

Figure 4A:
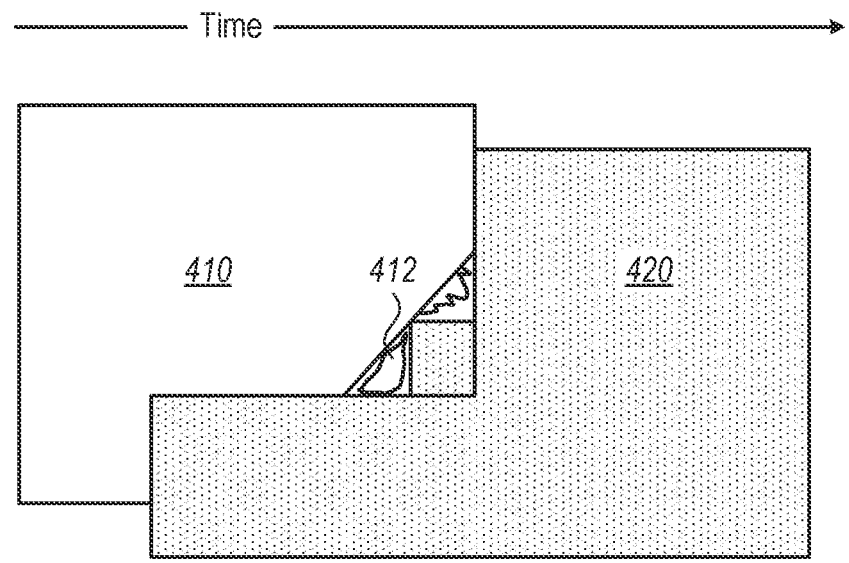
FIGS. 4A-4B show exemplary quantum executions, in accordance with some exemplary embodiments of the disclosed subject matter.

Referring now to FIG. 4A, showing exemplary quantum executions, in accordance with some exemplary embodiments of the disclosed subject matter.

In some exemplary embodiments, FIG. 4A depicts Quantum Circuits 410 and 420, which may be executed by the quantum operating system. In some exemplary embodiments, Quantum Circuit 410 may be generated, by the one or more software compilation modules, to enhance the flexibility and efficiency of an external management of the qubit pool, such as by creating or retaining Gap 412. For example, Gap 412 may be created by releasing qubits immediately when their role in the program ends, by delaying certain quantum operations, or the like. In some exemplary embodiments, this may enable the processing module of the quantum operating system to implement, during Gap 412, one or more quality increasing operations such as error mitigation operations or error resilience operations.

In some cases, qubit gaps of dirty qubits may be utilized by a different program, node, or the like, for a short period of time, e.g., less than a threshold. In some cases, sharing dirty qubits between programs may be more efficient than sharing dirty qubits between nodes of a same program, at least since dirty qubits of a first program may not be entangled with qubits of another program. In some exemplary embodiments, after utilizing dirty qubits for a different program or sub-program, the dirty qubits may be set to their previous quantum state, e.g., by the different program, by the processing module, or the like. In some exemplary embodiments, the processing module may determine whether or not to reuse a dirty qubit during a gap based on a number of cycles of the gap, an effect on the overall execution time and/or error rate from delaying other operations in order to increase the gap, or the like.

In case the dirty qubits are not set to be utilized by any scheduled program after the different program, the dirty qubits may not be processed to retain their previous states, e.g., by the processing module or by the requesting program. As another example, clean auxiliary qubits may be processed only in case that they are scheduled to be utilized by any other future program that is scheduled to be executed after the gap. For example, clean auxiliary qubits may be used by a first program, processed by the processing module, provided to a second program, and may not be processed after being released from the second program, in case that no other program is scheduled to use the qubits. Processing a clean qubit, in this context, may refer to setting the qubit to a known quantum state such as zero, ground state, or the like, such as by applying one or more state-shifting operations on the qubit.

Figure 4B:
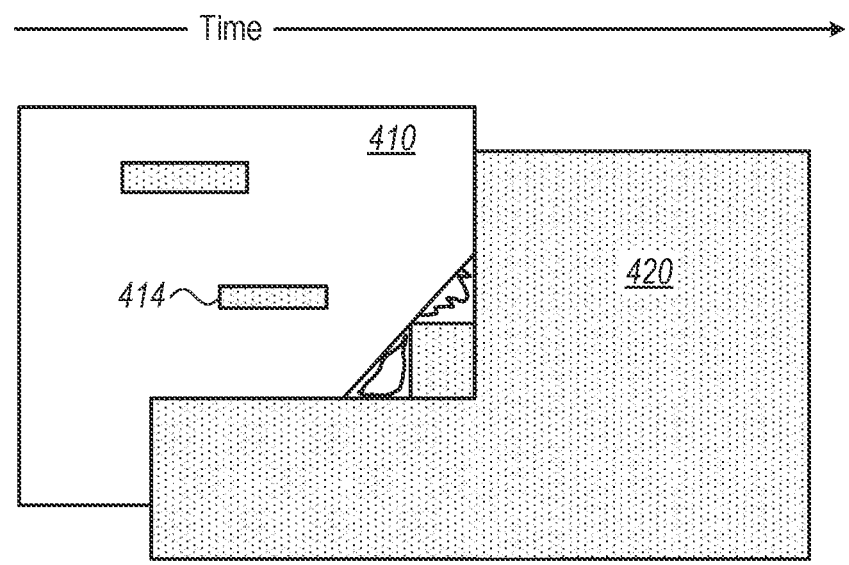

Referring now to FIG. 4B, showing exemplary quantum executions, in accordance with some exemplary embodiments of the disclosed subject matter.

In some exemplary embodiments, FIG. 4B depicts Quantum Circuits 410 and 420. In some exemplary embodiments, Quantum Circuit 410 may comprise dirty qubits that are idle for one or more cycles (e.g., above a cycle threshold), yet are not released from Quantum Circuit 410. In some exemplary embodiments, the processing module may utilize the dirty qubits of Quantum Circuit 410 for one or more purposes, such as for performing one or more operations of Quantum Circuit 420. For example, as depicted in FIG. 4B, during Execution Portion 414, a dirty qubit of Quantum Circuit 410 is allocated to perform one or more operations of Quantum Circuit 420, one or more quality increasing operations, or the like.

In some exemplary embodiments, software compilation modules may be configured to perform state preparation operations that can be easily reused. In some exemplary embodiments, each quantum program may require a preparation of multiple qubits, setting them with initial quantum states. In some exemplary embodiments, a state preparation operation that is applied to one qubit may, in some cases, be useful for preparing other qubits. For example, the state preparation operation may utilize a non-entangled dirty auxiliary qubit, which may have a quantum state that can be inferred or known based on the utilized state preparation operation. In such cases, the dirty auxiliary qubit that was used for the state preparation operation may be used for a different state preparation operation of the same or different program, for an operation that is not a state preparation operation, or the like. In some exemplary embodiments, in case an initial state of a qubit, as obtain by applying the state preparation operation, is reused by a second program, the second program may be executed after at least a portion of the first program, e.g., sequentially, thereby using the same qubit for both programs. For example, the programs may be aggregated over a number of overlapping qubits that are used by both programs.

One technical effect obtained by the disclosed subject matter is distributing qubit managements to a central entity acting as an operating system, e.g., the processing module of the quantum execution platform. In some exemplary embodiments, replacing qubit assignments of a quantum program with qubit allocation instructions and qubit release instructions, enables the processing module to allocate and release qubits from a qubit pool, according a real-time availability of qubits. For example, by allocating available qubits from the qubit pool, an overall idleness of qubits over time may be reduced.

Another technical effect is enabling the quantum operating system to allocate and release qubits from a qubit pool according to global calculations of the processing module that take into account multiple circuits being executed. For example, since the processing module may manage a qubit pool over all quantum programs that are set to be executed thereby, the qubits from the qubit pool may be allocated based on cross-program calculations, global execution optimizations, or the like, taking into account various executed or scheduled programs.

Yet another technical effect obtained by the disclosed subject matter is enabling to utilize gaps of idle or released qubits. In some exemplary embodiments, distributing the management of the qubit pool to the processing module at the quantum execution platform enables to utilize idle or released qubits for other programs, for quality-increasing operations, or the like, thereby minimizing the number of idle qubits per cycle of the execution. In some cases, utilizing qubits efficiently may reduce an execution time of all scheduled programs, causing an error rate of the execution to be reduced (e.g., an error rate that is caused by long execution times).

Yet another technical effect obtained by the disclosed subject matter is reducing a computational burden of the software compilation modules, by distributing all the qubit assignments and releases to a central entity such as the processing module of the quantum operating system. In some exemplary embodiments, distributing all the qubit assignments and releases to a central entity such as the processing module may reduce the computational burden of both the software compilation modules, and reduce a delay to the execution that stems from prolonged compilation processes. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 5:
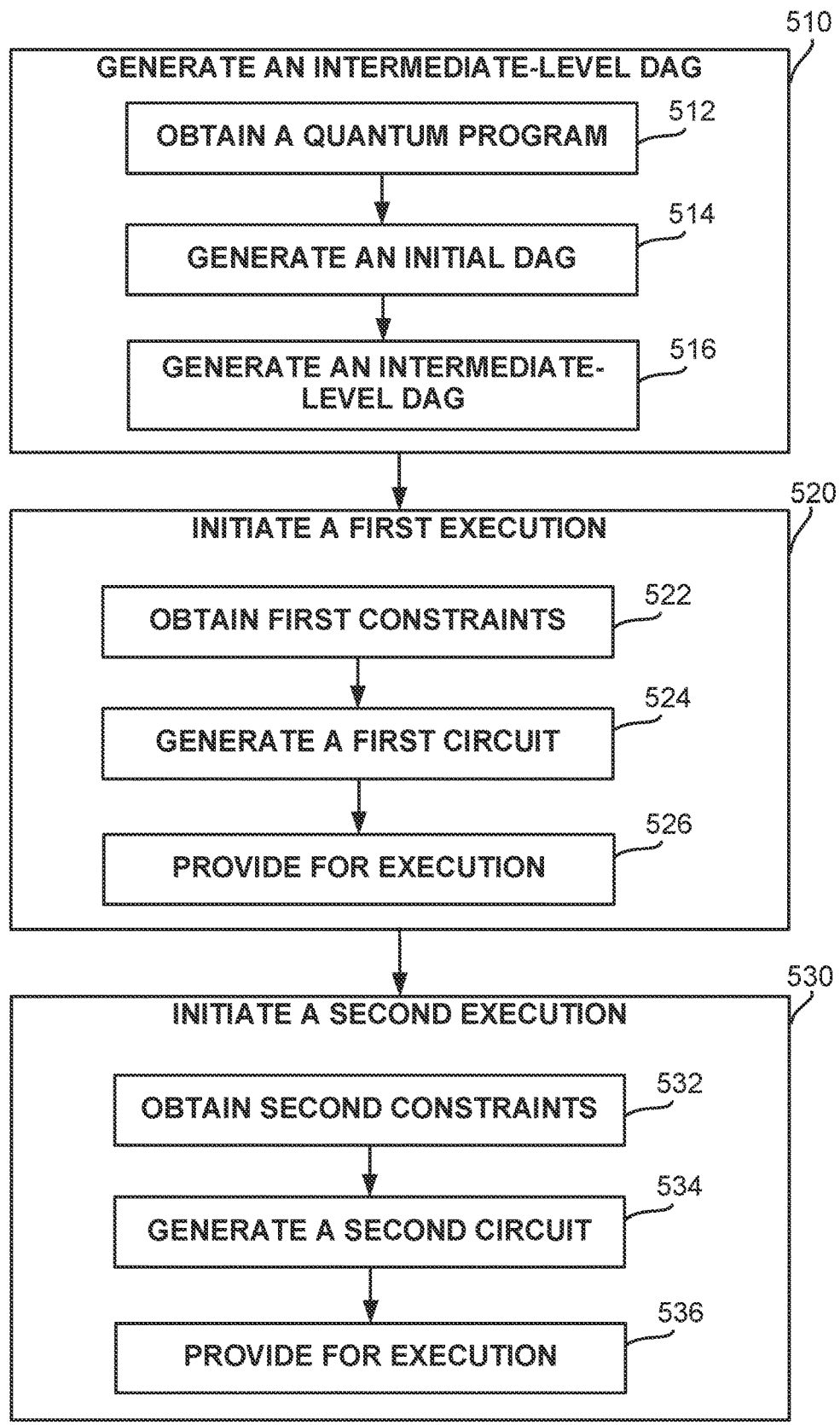
FIG. 5 shows an exemplary flowchart diagram of a method, in accordance with some exemplary embodiments of the disclosed subject matter.

Referring now to FIG. 5, showing an exemplary flowchart diagram of a method, in accordance with some exemplary embodiments of the disclosed subject matter.

On Step 510, an intermediate-level data structure may be generated by a first software compiler, based on a quantum program. In some exemplary embodiments, the intermediate-level data structure may be generated as part of a compilation process of the quantum program, which may be distributed between first and second software compilers. In some exemplary embodiments, the compilation process may comprise parsing the quantum program at the first software compiler, and processing the quantum program at the first software compiler to generate the intermediate-level data structure. In some exemplary embodiments, the intermediate-level data structure may be generated according to Sub-Steps 512-516.

On Sub-Step 512, a quantum program may be obtained from an entity such as a programmer, a quantum cloud, a server, or the like. In some exemplary embodiments, the quantum program may be generated by a user in a programming environment that supports one or more high level programming languages, in an abstract form that does not necessarily refer to a qubit set, a gate set, or the like. For example, the environment may correspond to the environment disclosed in U.S. application Ser. No. 17/450,583, titled "Functional-Level Processing Component For Quantum Computers", filed Oct. 12, 2021, which is hereby incorporated by reference in its entirety for all purposes without giving rise to disavowment. The environment may or may not provide access to libraries with functions, variable types, or the like, e.g., QCL™ libraries. In some exemplary embodiments, the quantum program may comprise or represent one or more functionalities that are designed to be implemented in a quantum circuit. In some exemplary embodiments, a functionality may be a logical abstraction of a sub-circuit having a predetermined functionality. For example, a functionality of the quantum program may define a summation operation of qubit states. In some exemplary embodiments, a functionality may be designed to be implemented by a sub-circuit that is executed over two or more cycles, using two or more qubits, using two or more quantum gates, or the like.

On Sub-Step 514, the first software compiler may obtain the quantum program, and generate based thereon a functional-level data structure that represents the quantum program. In some exemplary embodiments, the functional-level data structure may comprise an initial DAG data structure, or any other data structure. In some exemplary embodiments, each node of the initial DAG may represent a functionality that the quantum program is designed to implement in a quantum circuit, a portion thereof, or the like. For example, a node of the initial DAG may be represented by a functional block representing, in a non-executable abstract manner, the functionality that the quantum program is designed to implement in a quantum circuit (e.g., a summation operation). In some exemplary embodiments, each edge of the initial DAG may correspond to a one or more constraints, such as a precedence constraint between two functionalities, input-output constraints, or the like. In some exemplary embodiments, the initial DAG may constitute a non-executable representation of the quantum program, at least since all of the nodes may comprise high-level non-executable nodes that cannot be executed by a quantum execution platform such as a cloud or a quantum computer.

On Sub-Step 516, the first software compiler may process the initial DAG, and generate based thereon an intermediate-level data structure, e.g., an intermediate-level DAG. In some exemplary embodiments, the intermediate-level data structure may be processed based on global constraints of the quantum execution platform. For example, global constraints may comprise a total number of available gates of each type in the quantum execution platform, a total number of available qubits in the quantum execution platform, connectivity properties of the qubits in the quantum execution platform, error mitigation steps that can be performed by the quantum execution platform, or the like.

In some exemplary embodiments, the intermediate-level data structure may comprise a processed version of the initial DAG, at a more advanced stage of the compilation process. In some exemplary embodiments, the intermediate-level DAG may not comprise a fully compiled version of the initial DAG, but rather an intermediate stage between the initial DAG and a fully compiled, executable, DAG. For example, the intermediate-level data structure may determine one or more implementations for a node of the initial DAG (e.g., a functional block), may perform one or more computations that can assist in generating an implementation for nodes of the initial DAG, or the like. In some exemplary embodiments, an implementation of a node of the initial DAG comprises a set of one or more logical qubits that are being manipulated over a plurality of cycles. In some exemplary embodiments, an implementation of a node of the initial DAG may be executable by the quantum execution platform (e.g., obtained and executed by the quantum execution platform). In some exemplary embodiments, an executable implementation of a node may comprise a set of logical qubits that are being manipulated over a plurality of cycles.

In some exemplary embodiments, although the intermediate-level DAG may comprise the initial DAG in a more advanced compilation stage, the intermediate-level DAG may not be fully executable. For example, the intermediate-level DAG may constitute a non-executable representation of the quantum program that has at least one node that is not executable by a quantum execution platform. For example, all nodes of the intermediate-level DAG may not be executable, some nodes of the intermediate-level DAG may not be executable, a single node of the intermediate-level DAG may not be executable, or the like. In some cases, a non-executable node of the intermediate-level DAG may comprise a functional block, a functional block with more than one executable implementation from which one must be selected, or the like.

In some exemplary embodiments, the first software compiler may obtain implementations of nodes by dynamically generating the implementations from scratch, dynamically generating the implementations based on one or more library instances, obtaining pre-defined implementations from a library, or the like.

In some exemplary embodiments, the intermediate-level DAG may be generated by selecting from a library a subset of two or more potential alternative implementations of a node of the initial DAG, and linking them to the node (e.g., by replacing the original node of the initial DAG with the subset). For example, the intermediate-level DAG may be generated to comprise two or more alternative implementations of a node of the initial DAG, without a selection of a single implementation that is to be used.

In some exemplary embodiments, the intermediate-level DAG may be generated by synthesizing an executable node that is executable by the quantum execution platform, and replacing the original node of the initial DAG with the executable node in the intermediate-level DAG. For example, the intermediate-level DAG may be generated to comprise an executable implementation of a node of the initial DAG. In other cases, the intermediate-level DAG may be generated without modifying a node of the initial DAG, e.g., to include a non-executable node, or functional block, of the initial DAG.

In some exemplary embodiments, the intermediate-level DAG may be generated by determining a CSP, or any other problem representation, that corresponds to the problem of synthesizing the quantum program. In some exemplary embodiments, the CSP may be generated to comprise variables, domains and constraints, each variable having a corresponding domain that defines one or more potential values of the variable. In some exemplary embodiments, the constraints may define one or more constraints on values of the variables, a portion thereof, or the like. For example, the constraints may comprise global resource constraints of the quantum execution platform, precedence constraint of each edge of the initial DAG, or the like. In some exemplary embodiments, a solution of the CSP may define a quantum circuit that implements the quantum program, while complying with the constraints.

In some exemplary embodiments, instead of solving the CSP, one or more variable domains of the CSP may be reduced. In some exemplary embodiments, a sub-domain may be determined for a respective domain with a respective variable, to thereby reduce the domain of the variable to the sub-domain. For example, the sub-domain may comprise one or more ranges of one or more values of the variable that together, comprise a reduced number of values than the original domain of the variable. As another example, the sub-domain may comprise one or more discreet values of the variable that together, comprise a reduced number of values than the original domain of the variable. In some cases, the sub-domain may comprise a single value of the variable, and may be determined by identifying that all solutions of the CSP comprise a same single value of the variable. In such cases, the sub-domain may be determined to be a singleton domain consisting of only one single value, replacing the original domain of the variable that included at least one additional value.

In some exemplary embodiments, one or more determined sub-domains of respective variables may, together, define a simplified CSP that uses the sub-domains instead of the domains with respect to the variables. In some exemplary embodiments, a solution of the simplified CSP may define a respective quantum circuit that implements the quantum program. In some exemplary embodiments, the intermediate-level DAG may be generated by associating the initial DAG with the simplified CSP, such as by generating metadata that indicates the simplified CSP, adding or linking the simplified CSP to a data structure of the initial DAG, or the like. For example, in this case, the intermediate-level DAG may correspond to the initial DAG, with an additional indication of the simplified CSP. In other cases, the intermediate-level DAG may comprise one or more partially or fully inlined nodes.

In some exemplary embodiments, the intermediate-level data structure may be provided to a second software compiler, different from the first software compiler. In some cases, the first software compiler may constitute a 'batch' compiler configured to be executed once for the quantum program, while the second software compiler may constitute an 'online' compiler that is configured to be executed multiple times, e.g., for every execution of the quantum program on the quantum execution platform. In some exemplary embodiments, the second software compiler may complete the compilation process of the intermediate-level DAG iteratively, such as for each execution of the quantum program on the quantum execution platform. For example, two compilation iterations of the second software compiler may correspond to Steps 520 and 530. In other cases, any other number of compilation iterations may be performed, e.g., hundreds of iterations, thousands of iterations, or the like.

On Step 520, the second software compiler may complete a compilation process of the quantum program, thereby initiating a first execution of a quantum program at the quantum execution platform. For example, completing the compilation process may comprise converting the intermediate-level DAG to an executable DAG, a quantum circuit, or the like, and providing the executable result to the quantum execution platform. In some exemplary embodiments, the first execution may be initiated according to Sub-Steps 522-526.

On Sub-Step 522, the second software compiler may obtain first real-time constraints on an availability of resources of the quantum execution platform for the first execution of the quantum program. In some exemplary embodiments, the second software compiler may be configured to communicate with the quantum execution platform, such as with a hardware compiler thereof, and may obtain the first real-time constraints from the quantum execution platform.

In some exemplary embodiments, the first real-time constraints may indicate an availability of the resources, such as a connectivity configuration of qubits of the quantum execution platform that are available during one or more timeslots (e.g., cycles), a number of the qubits of the quantum execution platform that are available for one or more timeslots, a number of the qubits of the quantum execution platform of a specific qubit type (e.g., clean, dirty, auxiliary, or the like) that are available for one or more timeslots, a number of qubits of one or more types that are scheduled to be released by one or more currently executed programs at one or more future timeslots, or the like.

In some exemplary embodiments, the availability of resources of the quantum execution platform for the first execution, as indicated by the first real-time constraints, may depend on one or more executions of other quantum circuits. For example, the availability of resources may depend on a previous quantum circuit (e.g., implementing a second quantum program, or the same quantum program) that was previously executed on the quantum execution platform, affecting the number of available resources of the quantum execution platform for one or more timeslots (e.g., as qubits need to be cleaned and reused). As another example, the availability of resources may depend on at least one different quantum circuit that is currently being executed on the quantum execution platform, thereby reducing the number of available resources of the quantum execution platform for one or more timeslots. For example, a different quantum circuit may have one or more scheduled operations of quantum gates on quantum qubits, thereby reducing the number of gates and qubits that the first execution can use during the scheduled operations. In some cases, the availability of resources of the quantum execution platform may depend on a plurality of quantum circuits that have been executed by the quantum execution platform, are scheduled to be executed on the quantum execution platform, a combination thereof, or the like. In such cases, the plurality of quantum circuits may implement one or more second quantum programs, which may or may not differ from the quantum program obtained at Sub-Step 512. For example, the quantum program obtained at Sub-Step 512 may be obtained from a different entity than the one or more second quantum programs, e.g., from a different programmer, from a different client of the quantum execution platform, from a different corporations, or the like. In some cases, the one or more second quantum programs may be compiled previously by the first and second software compilers, or may be compiled by a third party compiler, or any other compilation module.

On Sub-Step 524, the second software compiler may generate a first quantum circuit that implements the intermediate-level DAG and is executable by the quantum execution platform. In some exemplary embodiments, the first quantum circuit may comprise a single gate-level implementation for each node of the intermediate-level DAG. In some exemplary embodiments, all nodes of the intermediate-level DAG may be executable within the first quantum circuit, thus making the first quantum circuit executable. In some cases, the first quantum circuit may comprise a scheduling of the nodes of the intermediate-level DAG over a qubit-cycle space (e.g., a space defined by an axis of cycles and a perpendicular axis of qubits).

In some exemplary embodiments, the second software compiler may generate the first quantum circuit based on the first real-time constraints, e.g., so that the first quantum circuit complies with the first real-time constraints. For example, the first quantum circuit may be generated to utilize as many of the available resources as possible (e.g., by assigning idle resources a negative or negligible cost). In some exemplary embodiments, the second software compiler may be configured to utilize an output of the first software compiler, instead of processing the quantum program, which reduces the amount of computations that are required for the compilation process. For example, the second software compiler may re-use the parsed quantum program that was already performed by the first software compiler, re-use CSP calculations performed by the first software compiler, implementation selections performed by the first software compiler, or the like.

In some exemplary embodiments, in case the intermediate-level DAG excludes an implementation of a node, the second software compiler may generate the first quantum circuit by determining, selecting, generating, or the like, an implementation of the node, e.g., according to the first real-time constraints. In some exemplary embodiments, the second software compiler may obtain implementations of nodes by dynamically generating the implementations from scratch, dynamically generating the implementations based on one or more library instances, obtaining the implementations from a library, or the like. It is noted that a library may refer to any repository, database, or the like, that may store instances that implement quantum programs in a manner that can be executable by the quantum execution platform.

In some exemplary embodiments, in case the intermediate-level DAG includes a synthesized executable node (e.g., a single implementation of a node of the initial DAG) that is executable by the quantum execution platform, the second software compiler may generate the first quantum circuit by including the synthesized executable node in the first quantum circuit, e.g., without processing the synthesized instance, without processing the respective node, or the like. In some exemplary embodiments, computational resources associated with synthesizing the executable node may be utilized only once, by the first software compiler, while the second software compiler may utilize an outcome of the first software compiler, thereby enabling the second software compiler not to utilize the computational resources.

In some exemplary embodiments, in case the intermediate-level DAG comprises two or more alternative implementations of a node, the second software compiler may generate the first quantum circuit by selecting one implementation from the two or more alternative implementations, e.g., according to the first real-time constraints. For example, the intermediate-level DAG may comprise a node associated with a subset of two or more potential alternative implementations thereof, e.g., obtained from a library, dynamically synthesized, or the like. According to this example, the first quantum circuit may be generated to include one of the potential alternative implementations, such as one that is estimated to match better than others to the first real-time constraints.

In some exemplary embodiments, in case the intermediate-level DAG is associated with a simplified CSP, the second software compiler may add the first real-time constraints to the constraints of the simplified CSP, thereby defining a first execution-specific simplified CSP. In some exemplary embodiments, the first quantum circuit may be generated by utilizing a CSP solver to solve the first execution-specific simplified CSP, thereby complying with the first real-time constraints. In some exemplary embodiments, the CSP solver may utilize a reduced amount of computational resources for solving the first execution-specific simplified CSP compared to an amount of computational resources that is required for solving an execution-specific CSP that includes the CSP and the first real-time constraints, at least since the first execution-specific simplified CSP may comprise a smaller domain for at least one variable.

In some exemplary embodiments, the second software compiler may determine, select, synthesize, or the like, node implementations based on the first real-time constraints, the global constraints of the quantum execution platform, based on the CSP solver, based on one or more optimizations, or the like. For example, a determination of an implementation of one or more nodes may be performed according to U.S. application Ser. No. 17/938,346, titled "Selecting a Quantum Computer", filed Jun. 10, 2022, which is hereby incorporated by reference in its entirety for all purposes without giving rise to disavowment.

On Sub-Step 526, the first quantum circuit may be provided to the quantum execution platform, to be executed thereon. In some exemplary embodiments, the first quantum circuit may be executed on the quantum execution platform, such as by one or more quantum computers thereof.

On Step 530, in order to initiate a second execution of the quantum program, the second software compiler may re-complete a compilation process of the quantum program, similarly to Step 520. In some exemplary embodiments, the second execution may be initiated according to Sub-Steps 532-536, which may correspond to Sub-Steps 522-526 of Step 520.

On Sub-Step 532, the second software compiler may obtain second real-time constraints on an availability of resources of the quantum execution platform for the second execution of the quantum program. For example, the second real-time constraints may be different from the first real-time constraints, as they may be obtained at a subsequent time period that may have different constraints on the availability of the resources of the quantum execution platform. For example, the second real-time constraints may be affected by the execution of the first quantum circuit. In some exemplary embodiments, the second real-time constraints may correspond to the first real-time constraints of Sub-Step 522.

On Sub-Step 534, the second software compiler may generate a second quantum circuit that implements the intermediate-level DAG and is executable by the quantum execution platform. In some exemplary embodiments, the second software compiler may generate the second quantum circuit based on the second real-time constraints, e.g., so that the second quantum circuit complies with the second real-time constraints. In some exemplary embodiments, the second real-time constraints may depend on an execution of one or more quantum circuits, e.g., quantum circuits implementing the same quantum program, quantum circuits implementing different quantum programs, or the like.

In some exemplary embodiments, the second quantum circuit may be different than the first quantum circuit. In some exemplary embodiments, the second quantum circuit may utilize different quantum resources than the first quantum circuit, e.g., a different number of qubits, different qubits, different gates, different allocations of cycles for gates, or the like, although both first and second quantum circuits implement the same intermediate-level DAG. For example, the second quantum circuit may be implement the quantum program in a different manner from the first quantum circuit, utilizing a different number of qubits, gates, a different allocation of cycles, or the like.

In some exemplary embodiments, the second quantum circuit may be generated similarly to the generation of the first quantum circuit, as described in Sub-Step 524. For example, in case that the intermediate-level DAG is associated with a simplified CSP, the second software compiler may generate the second quantum circuit by adding the second real-time constraints to the constraints of the simplified CSP, thereby defining a second execution-specific simplified CSP, and utilizing a CSP solver to solve the second execution-specific simplified CSP, thereby ensuring that a resulting circuit complies with the second real-time constraints. In some exemplary embodiments, the CSP solver may utilize a reduced amount of computational resources for solving the second execution-specific simplified CSP compared to an amount of computational resources that is required for solving an execution-specific CSP that includes the CSP and the second real-time constraints, at least since the second execution-specific simplified CSP may comprise a smaller domain for at least one variable. As another example, in case that the intermediate-level DAG comprises an executable node, the second software compiler may generate the second quantum circuit by including the synthesized executable node in the second quantum circuit, e.g., without processing or re-synthesizing the synthesized instance.

In one scenario, in case that the intermediate-level DAG comprises two or more alternative implementations of a node, the first quantum circuit may be generated by selecting a first implementation therefrom, and the second quantum circuit may be generated by selecting a second, different implementation therefrom, thus resulting with different quantum circuits. For example, the first implementation may comply with the first real-time constraints, while the second implementation may comply with the second real-time constraints.

In one scenario, the second real-time constraints may depend on an execution of a previous circuit, such as the first quantum circuit, by the quantum execution platform. In such cases, the second quantum circuit may be generated to be executed in parallel to at least a portion of the execution of the first quantum circuit. In other cases, the second quantum circuit may be generated to be executed in parallel, during one or more overlapping cycles, to one or more portions of any other circuit that is being executed by the quantum execution platform.

On Sub-Step 536, the second quantum circuit may be provided to the quantum execution platform to be executed thereon. In some exemplary embodiments, the second quantum circuit may be executed on the quantum execution platform.

In some exemplary embodiments, the quantum program may be scheduled to be executed a plurality of times, e.g., thousands of times, hundreds of times, or the like, each of which corresponding to Step 520 or Step 530. In some exemplary embodiments, the intermediate-level DAG may be generated only once, while the quantum circuits may be generated a plurality of times by the second software compiler. In some exemplary embodiments, for each execution, the second quantum circuit may be configured to obtain real-time constraints on the availability of resources of the quantum execution platform, and generate a respective quantum circuit accordingly. For example, Steps 520 and 530 may correspond to two executions. In other cases, the second quantum circuit may be configured to obtain real-time constraints periodically for any other defined time period, such as every defined event, continuously, for every generation of a quantum circuit by the second software compiler, for every three executions, or the like.

Referring now to FIG. 6, showing an exemplary flowchart diagram of a method, in accordance with some exemplary embodiments of the disclosed subject matter.

On Step 610, a distribution of a compilation process of a quantum program between a first software compiler and a second software compiler, may be dynamically selected. In some exemplary embodiments, the first and second software compilers may correspond to those described in the method of FIG. 5. For example, the second software compiler may differ from the first software compiler, e.g., by having access to real-time constraints on the availability of resources of a quantum execution platform. In some exemplary embodiments, the first software compiler may constitute a 'batch' compiler that is configured to be executed once for the quantum program, while the second software compiler may constitute an 'online' compiler that is configured to be utilized for every execution of the quantum program on the quantum execution platform.

In some exemplary embodiments, the compilation process may be configured to process the quantum program and to generate a quantum circuit that implements the quantum program. For example, the compilation process may be configured to select an order between the functionalities of the quantum program, manage qubit allocations and uncomputations, select an allocation of physical qubits to logical qubits, generate a QEC assignment, select swap chain implementations, or the like.

In some exemplary embodiments, the selected distribution of the compilation process may comprise selecting to perform a first set of computations of the compilation process at the first software compiler, and to perform a second set of computations of the compilation process at the second software compiler. For example, the first and second sets may be disjoint sets, such that no operation is performed once by the first software compiler, and again by the second software compiler. In other cases, a same operation may be included in both the first and second sets of computations. In some cases, the first and second sets of computations may comprise generating an initial DAG representing functionalities of the quantum program, generating an intermediate-level data structure, selecting at least one implementation for one or more nodes of the initial DAG, scheduling one or more implementations relative to one another, determining a QEC assignment, partially or fully solving a CSP problem, or the like.

In some exemplary embodiments, the distribution of the compilation process may be selected dynamically, such as based on parameters that may differ for different quantum programs. In some exemplary embodiments, the distribution of the compilation process may be selected based on the number of times that the quantum program is scheduled to be executed by the quantum execution platform. For example, as the number of executions increases, the load of the computations may be distributed in greater quantities to the first software compiler. In some exemplary embodiments, the distribution of the compilation process may be selected based on the amount of available classical computation resources available for the first software compiler, an estimated amount of available classical computation resources that will be available for the second software compiler, an amount of available quantum resources for the execution of the quantum program, or the like. For example, compilation modules with less computation resources may be allocated less computations, and vice versa.

In some exemplary embodiments, the amount of available quantum resources may be linearly correlated to an order of magnitude of changes that would need to be made to a quantum circuit that is implemented without access to the real-time constraints. In some exemplary embodiments, as the amount of available quantum resources is estimated to be higher, the second software compiler may need to perform less changes to an intermediate-level DAG, even if the intermediate-level DAG is almost fully implemented. In such cases, the computational load of the first software compiler may be increased, and vice versa.

In some exemplary embodiments, the distribution of the compilation process may be selected based on an estimated utility of the selected distribution of the compilation process, and an estimated cost of implementing the distribution of the compilation process. For example, one or more candidate distributions of computations may be determined, and a cost function may be used to estimate the cost of implementing each distribution. The cost of each distribution may be compared to its estimated utility, and a distribution with the largest delta between the cost and the utility may be selected.

On Step 620, an intermediate-level data structure may be generated based on the quantum program, e.g., at the first software compiler. In some exemplary embodiments, the intermediate-level data structure may comprise the intermediate-level DAG of FIG. 5, or any other data structure. In some exemplary embodiments, the first software compiler may generate the initial DAG of FIG. 5, and generate based thereon the intermediate-level DAG of FIG. 5. In some exemplary embodiments, the intermediate-level DAG may comprise a non-executable representation of the quantum program.

In some exemplary embodiments, the intermediate-level DAG may be generated according to the selected distribution, e.g., the first set of computations. For example, the first set of computations may comprise generating the initial DAG and the intermediate-level DAG. In some exemplary embodiments, the first set of computations may comprise selecting an implementation of a node of the initial DAG, selecting a plurality of alternative implementations of a node of the initial DAG, selecting an order between the nodes of the initial DAG, managing qubit allocations and uncomputations, determining a simplified CSP that corresponds to the quantum program, generating a QEC assignment, selecting swap chain implementations, or the like. Since the first software compiler has no access to real-time constraints, its computations may differ from those of the second software compiler.

In some exemplary embodiments, the second set of computations may comprise the remaining computations of the compilation process, such as computations that are needed for generating a quantum circuit implementing the quantum program, e.g., as described in Step 630. In some exemplary embodiments, after performing the first set of computations, the first software compiler may provide the intermediate-level data structure to the second software compiler.

On Step 630, the second software compiler may generate a quantum circuit implementing the intermediate-level data structure, by performing the second set of computations.

In some exemplary embodiments, the second set of computations may comprise the remaining computations of the compilation process, e.g., selecting and/or synthesizing an implementation of a node of the DAG from a plurality of alternative implementations, selecting an order between nodes that were not ordered by the first set of computations, managing qubit allocations and uncomputations that were not set by the first set of computations, solving a simplified CSP that was determined by the first set of computations, selecting an allocation of physical qubits to logical qubits that were not set by the first set of computations, generating a QEC assignment that was not generated by the first set of computations, selecting swap chain implementations that were not selected by the first set of computations, or the like.

In some exemplary embodiments, the second set of computations may comprise obtaining real-time constraints on the availability of resources of a quantum execution platform, and utilizing the real-time constraints for one or more computations of the second set of computations. For example, the second software compiler may periodically communicate with the quantum execution platform, such as with a hardware compiler thereof, in order to obtain therefrom real-time constraints. In some exemplary embodiments, the second set of computations may comprise synthesizing a quantum circuit that implements the quantum program, based on the real-time constraints. For example, the quantum circuit may be generated by ensuring that a single implementation is selected and synthesized for all nodes of the intermediate-level DAG.

In some cases, the first set of computations may comprise determining a CSP that corresponds to the quantum program. In some exemplary embodiments, the CSP may comprise variables, domains and constraints, each variable having a corresponding domain that defines one or more potential values of the variable. In some exemplary embodiments, the constraints may define one or more constraints on values of the variables or portion thereof. For example, the constraints may comprise global resource constraints of the quantum execution platform. In some exemplary embodiments, a solution to the CSP may define a respective quantum circuit that implements the quantum program. In such cases, the first set of computations may comprise identifying at least one sub-domain of a domain of a variable, whereby defining a simplified CSP that uses the sub-domain instead of the domain with respect to the variable. In some cases, the second set of computations may comprise utilizing a CSP solver to solve the simplified CSP, in view of the real-time constraints of the quantum execution platform (also referred to as 'execution-specific constraints'). In some exemplary embodiments, the real-time constraints may comprise constraints on an availability of resources of the quantum execution platform.

In some exemplary embodiments, the second set of computations may comprise obtaining or determining one or more real-time constraints, and adding the real-time constraints as constraints of the simplified CSP, thereby defining an execution-specific simplified CSP. In some exemplary embodiments, a solution of the execution-specific simplified CSP may define a resulting quantum circuit that implements the quantum program, and complies with the real-time constraints. In some exemplary embodiments, the second set of computations may comprise solving the execution-specific simplified CSP utilizing a CSP solver. In some exemplary embodiments, the CSP solver utilized for the second set of computations may utilize a reduced amount of computational resources for solving the execution-specific simplified CSP compared to an amount of computational resources that is required for solving the non-simplified CSP, e.g., an execution-specific CSP that includes the CSP and the real-time constraints, at least since the execution-specific simplified CSP may comprise a smaller domain for at least one variable.

In some cases, the first set of computations may comprise selecting implementations for one or more nodes of the initial DAG, and the second set of computations may comprise selecting implementations of all nodes in the intermediate-level DAG that lack a selected implementation. In some exemplary embodiments, in case that the first set of computations comprise synthesizing a single implementation of a specific node, the second set of computations may utilize the synthesized implementation, without processing the node any further. In some cases, the first set of computations may comprise selecting an order between a set of nodes of the initial DAG, and the second set of computations may comprise selecting an order between the remaining nodes and the ordered nodes. In some cases, the first set of computations may comprise selecting a QEC assignment for one or more logical qubits, and the second set of computations may comprise selecting a QEC assignment for any remaining logical qubits.

On Step 640, the quantum circuit generated on Step 630, may be provided to a quantum execution platform for execution thereby.

On Step 650, the quantum circuit may be executed on the quantum execution platform. In some exemplary embodiments, the quantum circuit may be executed for a large number of times, e.g., a thousand times. In some exemplary embodiments, each execution iteration may comprise performing Steps 630-650, e.g., obtaining updated real-time constraints at the second software compiler, performing the second set of computations to re-generate a quantum circuit based on the obtained updated real-time constraints and the same intermediate-level DAG, and providing the quantum circuit for execution. For example, a first quantum circuit generated by Steps 630-650 on a first iteration, may differ from a second quantum circuit generated by Steps 630-650 on a second iteration, at least in view of differing real-time constraints.

In some exemplary embodiments, the distribution may be adjusted or recalculated iteratively, periodically, upon detecting one or more events, or the like. In other cases, a single distribution may be determined by the first software compiler for each quantum program obtained thereby. In some cases, subsequently to providing the quantum circuit for execution on Step 640, the first software compiler may determine a second, different, distribution of the compilation process of the quantum program, such as for one or more subsequent executions of the quantum program. For example, the distribution may be adjusted, or recalculated, in case of identifying that one or more parameters have changed, that a change of one or more parameters complies with a threshold, or the like. For example, the second distribution may be determined in case a number of times that the quantum program is scheduled to be executed by the quantum execution platform has changed, in case that estimated amounts of resources of the second software compiler or the quantum execution platform was incorrect, in case that estimated utility of the selected distribution was incorrect, in case that estimated cost of implementing the distribution of the compilation process was incorrect, or the like.

For example, in case that a second distribution is determined for the same quantum program obtained at Step 610, a second intermediate-level data structure may be generated by the first software compiler according to the second distribution, and a second quantum circuit implementing the second intermediate-level data structure may be generated by the second software compiler according to the second distribution. The second quantum circuit may then be provided to the quantum execution platform for execution thereby, and executed thereon. For example, the first intermediate-level data structure may be configured to implement a majority of the nodes of the initial DAG, while the second intermediate-level data structure may be configured to implement a small number of nodes of the initial DAG, e.g., lesser than a threshold, one, zero, or the like.

Figure 7:
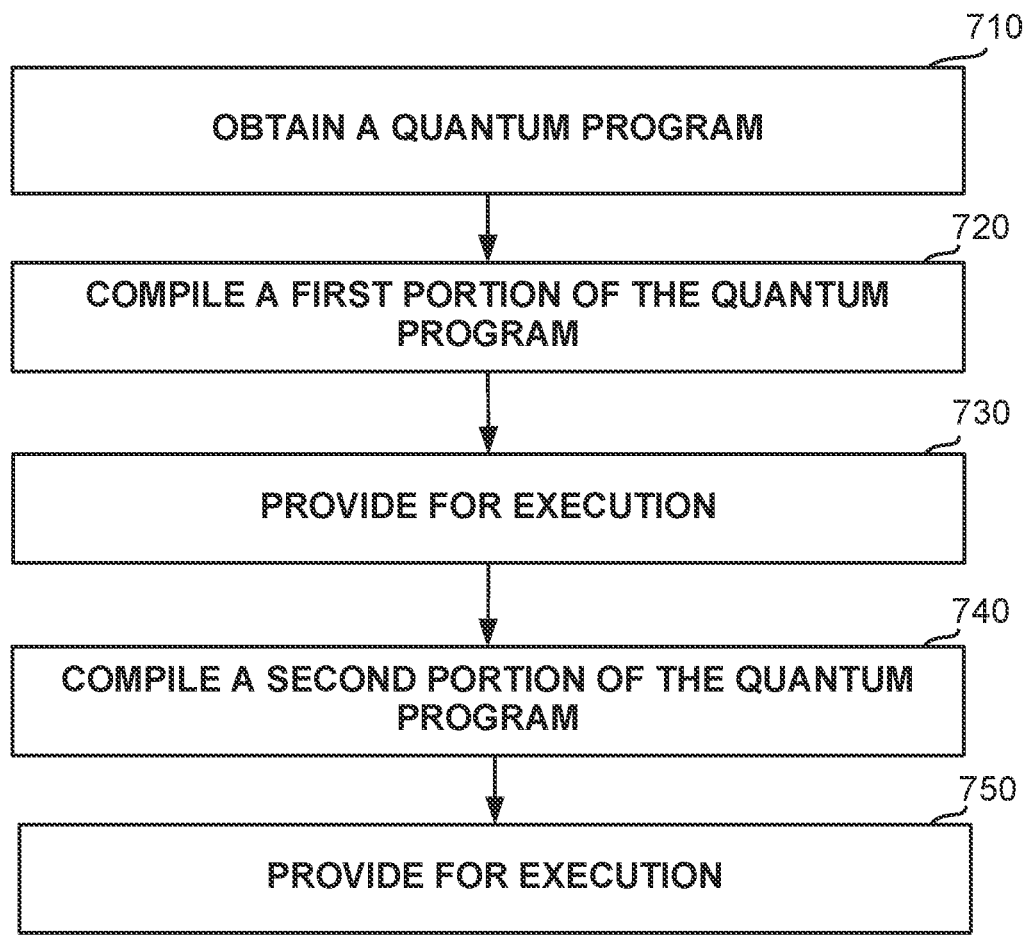
FIG. 7 shows an exemplary flowchart diagram of a method, in accordance with some exemplary embodiments of the disclosed subject matter.

Referring now to FIG. 7, showing an exemplary flowchart diagram of a method, in accordance with some exemplary embodiments of the disclosed subject matter.

On Step 710, a quantum program may be obtained. In some exemplary embodiments, the quantum program may comprise one or more functionalities that are intended to be implemented as quantum operations in a quantum circuit. For example, the quantum operations may comprise gates that are applied on a plurality of qubits during a plurality of ordered logical cycles. In some exemplary embodiments, the quantum program may not be executable on a quantum execution platform, e.g., similarly to the quantum program of Sub-Step 512 of FIG. 5.

On Step 720, a first portion of the quantum program may be compiled, to generate a first quantum circuit. For example, the compilation may be performed according to the process of FIG. 1, according to the compilation process of FIG. 3, or the like. In some exemplary embodiments, the first quantum circuit may be executable on the quantum execution platform. In some exemplary embodiments, the first quantum circuit may be configured to perform operations at a first subset of cycles of the plurality of ordered cycles.

In some exemplary embodiments, first real-time constraints on an availability of resources of the quantum execution platform for an execution of the first portion, may be obtained. For example, the constraints may be obtained by a transpiler, a second software compiler, or the like. In some exemplary embodiments, the first portion may be compiled based on the first real-time constraints.

In some exemplary embodiments, the availability of the resources may comprise a connectivity configuration of available qubits of the quantum execution platform, a number of the available qubits of the quantum execution platform for a time period, a number of the available qubits of the quantum execution platform of a specific qubit type for a timeframe, or the like. In some exemplary embodiments, the first real-time constraints may depend on a previous quantum circuit that is being executed on the quantum execution platform that was executed on the quantum execution platform, or the like. For example, the previous quantum circuit may implement a second quantum program that is provided to the quantum execution platform from a different entity, a same entity, or the like.

In some exemplary embodiments, the first portion of the quantum program may be compiled by determining a CSP that corresponds to the quantum program. In some exemplary embodiments, the CSP may comprise variables, domains and constraints, each variable of the variables having a corresponding domain that defines one or more potential values of the variable. In some exemplary embodiments, the constraints may define one or more constraints on values of the variables or portion thereof, such as global resource constraints of the quantum execution platform. In some exemplary embodiments, a solution of the CSP may define a quantum circuit that implements the quantum program and complies with the constraints. In some exemplary embodiments, the first quantum circuit may be generated by utilizing a CSP solver to solve the CSP. In some exemplary embodiments, the constraints of the CSP may comprise precedence constraint between the functionalities of the quantum program, the first real-time constraints, or any other constraints.

In some exemplary embodiments, the first portion of the quantum program may be compiled using any other optimizers, heuristics, or the like. For example, the first portion of the quantum program may be compiled according to the method of FIG. 5 or 6.

On Step 730, the first quantum circuit may be provided to the quantum execution platform to be executed thereby.

On Step 740, a second portion of the quantum program may be compiled, to generate a second quantum circuit. In some exemplary embodiments, the second quantum circuit may be configured to perform operations at a second subset of cycles of the plurality of ordered cycles, the second subset of cycles not overlapping with the first subset of cycles. For example, the first subset of cycles may include cycles that are ordered before an intermediate cycle, and the second subset of cycles may include the intermediate cycle and one or more cycles that are ordered after the intermediate cycle. As another example, the first subset of cycles may include a first cycle and a second cycle, and the second subset of cycles may include a third cycle and a fourth cycle, which may or may not be ordered after the first and second cycles. For example, the first cycle may be ordered before the third cycle, but the second cycle may be ordered after the fourth cycle. In other cases, any other order may be deployed between the cycles. In some exemplary embodiments, the second quantum circuit may be executable on the quantum execution platform.

In some exemplary embodiments, the first and second portions of the quantum program may constitute disjoint non-overlapping portions of the quantum program. In some exemplary embodiments, the second portion of the quantum program may be compiled similarly to the first portion of the quantum program.

In some exemplary embodiments, second real-time constraints on an availability of resources of the quantum execution platform for an execution of the second portion, may be obtained. In some exemplary embodiments, the second portion may be compiled based on the second real-time constraints. In some exemplary embodiments, the second real-time constraints may depend on a previous quantum circuit that is being executed on the quantum execution platform, a previous quantum circuit that was executed on the quantum execution platform, or the like. For example, in case at least a portion of an execution of the first quantum circuit by the quantum execution platform is performed in parallel to the compilation of the second portion of the quantum program, the second real-time constraints may depend on the execution of the first quantum circuit.

On Step 750, the second quantum circuit may be provided to the quantum execution platform to be executed thereby. In some exemplary embodiments, any other portions of the quantum program may be compiled and executed, until the entire program has been executed. In some exemplary embodiments, by compiling and executing portions of a quantum program, instead of the entire quantum program, an iterative compilation and execution of the quantum program may be performed.

Figure 8A:
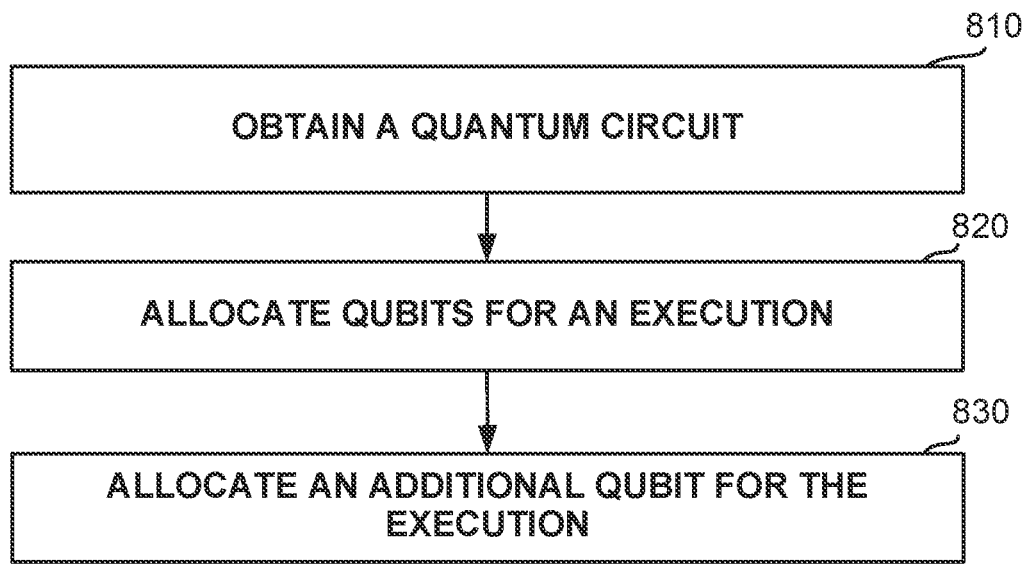
FIGS. 8A-8B show exemplary flowchart diagrams of a method, in accordance with some exemplary embodiments of the disclosed subject matter.
Figure 8B:
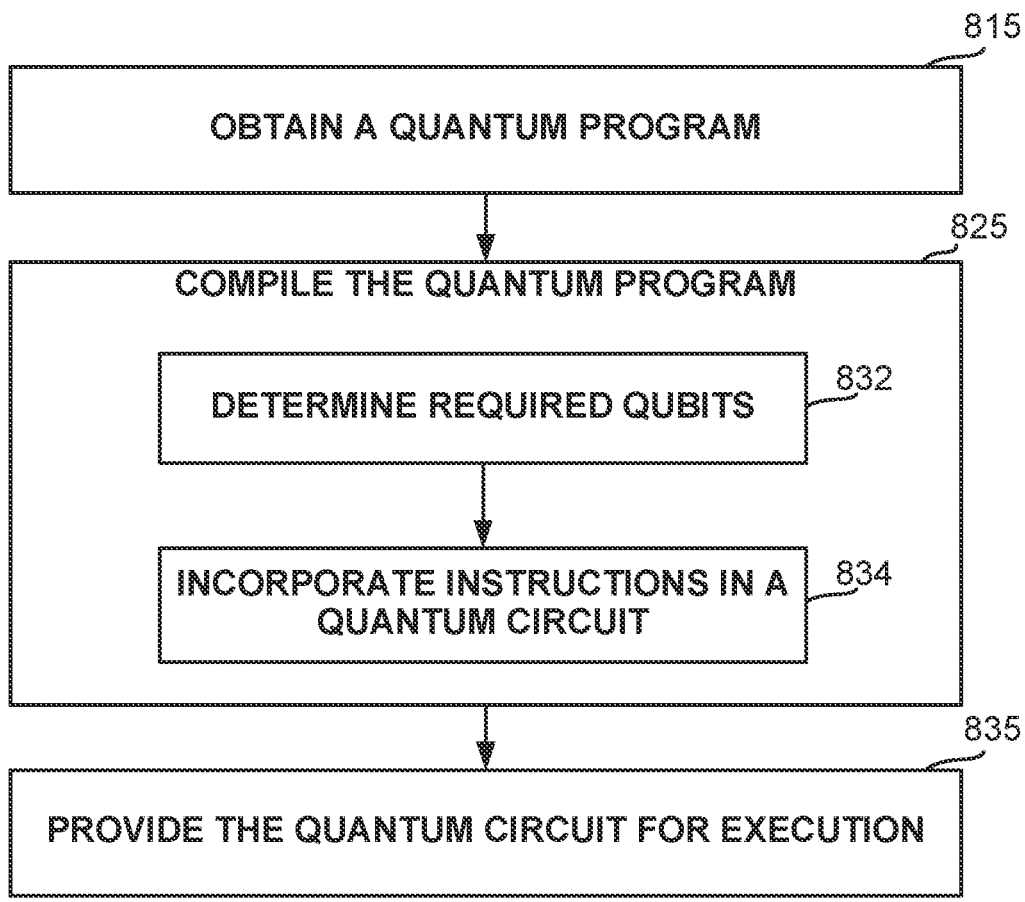

In some exemplary embodiments, FIGS. 8A-8B show exemplary flowchart diagrams of a method.

Referring now to FIG. 8A, showing an exemplary flowchart diagram of a method, in accordance with some exemplary embodiments of the disclosed subject matter.

On Step 810, a quantum circuit (e.g., or a representation thereof) may be obtained by a quantum execution platform. For example, the quantum circuit may be generated according to the method of FIG. 8B. In some exemplary embodiments, the quantum circuit may define quantum operations over a plurality of qubits during a plurality of ordered cycles. In some exemplary embodiments, the plurality of ordered cycles may commence at an initial cycle.

In some exemplary embodiments, the quantum circuit may comprise first and second qubit allocation instructions, the first qubit allocation instruction instructing to obtain a first set of one or more qubits at the initial cycle, and the second qubit allocation instruction instructing to obtain a second set of one or more qubits at an intermediate cycle. In some exemplary embodiments, the intermediate cycle may be ordered, in the plurality of ordered cycles, after the initial cycle. For example, the initial cycle may comprise the first cycle of the circuit, and the intermediate cycle may comprise the tenth cycle.

In some exemplary embodiments, the quantum circuit may comprise one or more qubit release instructions. For example, the qubit release instructions may instruct to release the first and second sets of one or more qubits subsequently to the intermediate cycle. For example, the first set of one or more qubits may be instructed to be released at one or more first cycles, and the second set of one or more qubits may be instructed to be released at one or more second cycles, the first and second cycles being subsequent to the intermediate cycle.

In some exemplary embodiments, the quantum circuit may exclude qubit allocations, qubit reuse operations, or the like. In some cases, the first and second sets of one or more qubits indicated by the quantum circuit may not comprise allocations of specific qubits, but rather may comprise indications of a number of qubits of a certain type (dirty, clean, entangled, disentangled, or the like) that are needed for the execution. For example, the first set of one or more qubits may indicate that three clean disentangled qubits are needed for a specified cycle. In some cases, the first and second sets of one or more qubits indicated by the quantum circuit may not comprise qubit reuse operations. In some cases, qubit reuse operations may comprise any operations that may be performed in order to re-use a qubit, such as cleaning a qubit, performing an uncompute operation, adjusting a quantum state of a qubit to match a state required by a different program or program portion, or the like. In some exemplary embodiments, instead of including qubit allocations and qubit reuse operations in the quantum circuit, the quantum execution platform may manage the qubit allocations and the reuse of qubits in a global manner, in view of real-time constraints and in view of a plurality of quantum circuits that are being executed and/or scheduled to be executed. For example, the qubit allocations and the reuse of qubits may be managed based on the first and second qubit allocation instructions of the quantum circuit, and based on one or more qubit release instructions of the quantum circuit.

In some exemplary embodiments, the quantum execution platform may or may not obtain metadata, in addition to obtaining the quantum circuit. For example, the metadata and/or the quantum circuit may be obtained from one or more classical computing modules, such as a software compiler. In some exemplary embodiments, the metadata may indicate one or more suggestions for executing the quantum circuit by the quantum execution platform. For example, the metadata may indicate connectivity priorities for allocations of physical qubits to the first and/or second sets of one or more qubits.

On Step 820, one or more qubits may be allocated for the execution of one or more cycles of the quantum circuit. In some exemplary embodiments, the execution of the one or more cycles of the quantum circuit may comprise an execution of the initial cycle. In some exemplary embodiments, the quantum execution platform may allocate, for the initial cycle, one or more qubits from a qubit pool to be utilized by the quantum circuit. In some exemplary embodiments, the one or more qubits may correspond to the first set of one or more qubits. For example, in case the first set of one or more qubits indicated by the first qubit allocation instruction comprises two auxiliary qubits and one non-auxiliary qubit, the one or more qubits may comprise respective two physical auxiliary qubits and a respective non-auxiliary physical qubit. As another example, in case the qubit allocation instruction requests two qubits that are dirty and disentangled, and one qubit with a known pure state, the quantum execution platform may allocate two dirty and one clean qubit.

In some exemplary embodiments, the qubit pool may be managed by the platform execution platform. In some exemplary embodiments, the qubit pool may comprise one or more auxiliary qubits, one or more non-auxiliary qubits, one or more clean qubits, one or more entangled qubits, one or more disentangled qubits, one or more qubit in known state, one or more qubits in unknown states, or the like. In some exemplary embodiments, the qubit pool may allocate and obtain released qubits dynamically throughout executions of quantum circuits, thus having a dynamically changing number of qubits in the qubit pool.

On Step 830, at least one additional qubit may be allocated to the execution after the execution of the one or more cycles. In some exemplary embodiments, in response to the execution reaching the intermediate cycle, the quantum execution platform may dynamically allocate at least one additional qubit from the qubit pool to be utilized by the quantum circuit. In some exemplary embodiments, the at least one additional qubit may correspond to the second set of one or more qubits. For example, in case the second set of one or more qubits indicated by the second qubit allocation instruction comprises four dirty non-auxiliary qubits, the at least one additional qubit may comprise four physical qubits that are dirty and are not auxiliary qubits.

In some exemplary embodiments, by allocating at least one additional qubit during the execution of the quantum circuit, a number of qubits utilized by the execution may be increased. For example, during the first one or more cycles of the execution the quantum circuit may utilize a first number of qubits, e.g., 15 qubits (including the one or more qubits), and during or after the intermediate cycle, the quantum circuit may utilize a second increased number of qubits, e.g., 20 qubits (including the at least one additional qubit and the one or more qubits).

In some exemplary embodiments, in case that metadata that was obtained with the quantum circuit indicates connectivity priorities for allocations of physical qubits to the second set of one or more qubits, the at least one additional qubit may be allocated to the quantum circuit based on the metadata (e.g., if possible). In other cases, the at least one additional qubit may be allocated to the quantum circuit based on any other metadata.

In case that the first set of one or more qubits, or portion thereof, is no longer utilized by the quantum circuit after the intermediate cycle, the quantum circuit may instruct to release the first set of one or more qubits before the intermediate cycle.

In some exemplary embodiments, in one scenario, the at least one additional qubit may be allocated to a second, different, quantum circuit during the execution of the initial cycle of the quantum circuit. For example, the at least one additional qubit may comprise qubit number five (or any other physical qubit identifier), and the qubit may be utilized by a second quantum circuit during the initial cycle, released from the second quantum circuit, and then allocated to the quantum circuit during the intermediate cycle.

In some exemplary embodiments, in another scenario, the quantum circuit may comprise a qubit release instruction to be performed at a second intermediate cycle that is ordered after the intermediate cycle. In some exemplary embodiments, the qubit release instruction may instruct to release the second set of one or more qubits. In some exemplary embodiments, in response to the execution reaching the second intermediate cycle, the qubit execution platform may be configured to dynamically release the at least one additional qubit from the execution. For example, the at least one additional qubit may be dynamically released by applying an uncompute operation on the at least one additional qubit, by applying a reset operation on the at least one additional qubit, or the like. In some cases, the at least one additional qubit may be processed by the quantum execution platform, or by a subsequent circuit to which the at least one additional qubit may be allocated. In some cases, the at least one additional qubit may not be processed, e.g., in case the subsequent circuit can utilize the quantum state of the at least one additional qubit without change. In some exemplary embodiments, the at least one additional qubit may be released to the qubit pool of the quantum execution platform. In some exemplary embodiments, releasing the at least one additional qubit may decrease the number of qubits utilized by the execution, e.g., by excluding the at least one additional qubit from being used for the execution after the second intermediate cycle.

In some exemplary embodiments, according to this scenario, after releasing the at least one additional qubit, the qubit may be allocated to a second, different, quantum circuit at one or more cycles that are subsequent to the second intermediate cycle. For example, the qubit may be allocated to the second quantum circuit during an execution of a cycle of the quantum circuit that is ordered after the second intermediate cycle of the quantum circuit. In some cases, the second quantum circuit may be obtained from a different entity than the quantum circuit, e.g., a different programmer, client, or the like. In other cases, the second quantum circuit may be obtained from a same entity than the quantum circuit. For example, the first and second quantum circuit may constitute different implementations of a same quantum program.

In some exemplary embodiments, in another scenario, the quantum execution platform may identify a gap of a qubit in the quantum circuit, during which the qubit is idle. In some exemplary embodiments, in response to identifying the gap, the quantum execution platform may assign one or more additional operations to the qubit during the gap, such as an error mitigation operation, an error resilience operation, or the like. For example, the quantum execution platform may assign a physical qubit to represent a logical qubit of the quantum circuit during a first duration, until an idle period (e.g., a gap). In some exemplary embodiments, the physical qubit may be utilized for an error mitigation operation during a gap, and then may be utilized for one or more additional operations of the quantum circuit.

In some exemplary embodiments, in response to identifying the gap, the quantum execution platform may assign one or more additional operations to the qubit during the gap, such as an operation of a second quantum circuit, e.g., in case the qubit is a dirty qubit. For example, the quantum execution platform may assign a physical qubit to represent a logical qubit of the quantum circuit during a first duration. The physical qubit may be utilized for performing one or more operations of the quantum circuit, associated with the logical qubit. In some exemplary embodiments, the physical qubit may be utilized for operations of a second quantum circuit during a gap that is subsequent to the first duration. For example, the logical qubit may be idle during the gap. In some exemplary embodiments, the physical qubit may utilized for the quantum circuit subsequently to the gap, during a second duration, e.g., after returning the physical qubit to its previous quantum state. For example, the qubit may be returned to its previous quantum state before being assigned back to the first quantum program. According to this example, the re-usage of the physical qubits during the gap may decrease a number of idle qubits per cycle, and enhance an overall execution of the first and second quantum circuits, e.g., by reducing an overall number of cycles of the combined execution.

Referring now to FIG. 8B, showing an exemplary flowchart diagram of a method, in accordance with some exemplary embodiments of the disclosed subject matter.

On Step 815, a quantum program may be obtained, e.g., at one or more classical compilation modules. In some exemplary embodiments, the quantum program may comprise one or more functionalities that are intended to be implemented as quantum operations in a quantum circuit. In some exemplary embodiments, the quantum program may not be executable on a quantum execution platform, e.g., at least since it may be defined in an abstract non-executable form.

On Step 825, the quantum program may be compiled to generate a quantum circuit that implements the quantum program and is executable by the quantum execution platform. In some exemplary embodiments, the quantum program may define quantum operations over a plurality of qubits during a plurality of ordered cycles. In some exemplary embodiments, the plurality of ordered cycles may commence at an initial cycle. In some exemplary embodiments, the quantum program may be compiled according to Sub-Steps 832-834.

In some exemplary embodiments, the quantum circuit may be generated to exclude qubit allocation operations, qubit reuse operations, or the like, such as in order to enable the quantum execution platform to efficiently manage the qubit pool as a central entity. In some exemplary embodiments, instead of qubit allocation operations, the quantum circuit may be generated to comprise one or more qubit allocation instructions, qubit release instructions, or the like. For example, the instructions may not be qubit-specific, and may relate to a quantity of qubits that are requested, a state of a qubit that is requested, a cycle during which the qubit is requested, or the like. In some exemplary embodiments, based on the qubit allocation and release instructions, the quantum execution platform may be enabled to manage the qubit allocations.

In some exemplary embodiments, the quantum circuit may be generated to increase or maintain one or more qubit gaps, during which the qubit is idle. In some exemplary embodiments, such gaps may be utilized by the quantum execution platform for performing one or more additional operations such as error mitigation operations. In some exemplary embodiments, such gaps may be utilized by the quantum execution platform to implement operations of other quantum circuits, other portions of the same quantum circuit, or the like.

On Sub-Step 832, the quantum operations may be determined to request a set of one or more qubits at the initial cycle. In some exemplary embodiments, the set of one or more qubits may comprise one or more auxiliary qubits, one or more non-auxiliary qubits, clean qubits, dirty qubits, a combination thereof, or the like.

In some exemplary embodiments, the quantum operations may be determined to request, at an intermediate cycle, the set of one or more qubits and at least one additional qubit. In some exemplary embodiments, the intermediate cycle may be ordered, in the plurality of ordered cycles, after the initial cycle. In some exemplary embodiments, the at least one additional qubit may comprise one or more auxiliary qubits, one or more non-auxiliary qubits, a combination thereof, or the like. In some cases, the at least one additional qubit and the set of one or more qubits may be comprised by a super-set.

In some cases, the quantum operations may be determined not to request any of the requested qubits, at one or more cycles that are ordered after the intermediate cycle. For example, in such cases, the qubits may be determined to be releasable subsequently to the intermediate cycle.

On Sub-Step 834, a first qubit allocation instruction may be determined and incorporated in the quantum circuit. In some exemplary embodiments, the first qubit allocation instruction may instruct to allocate the set of one or more qubits at the initial cycle. In some exemplary embodiments, the first qubit allocation instruction may indicate a quantity of the set of one or more qubits, target quantum states for the set of one or more qubits, the initial cycle, or the like. In some exemplary embodiments, the first qubit allocation instruction may instruct to allocate one or more auxiliary qubits, one or more non-auxiliary qubits, or the like, e.g., as determined by Sub-Step 832. In some exemplary embodiments, the first qubit allocation instruction may be incorporated by linking the request to the initial cycle of the quantum circuit, by adding the request to metadata, or by representing the request using any other data structure external or internal to the quantum circuit.

In some exemplary embodiments, a second qubit allocation instruction may be incorporated in the quantum circuit. In some exemplary embodiments, the second qubit allocation instruction may instruct to allocate the at least one additional qubit at the intermediate cycle. In some exemplary embodiments, the second qubit allocation instruction indicates a quantity of the at least one additional qubit, target quantum states for the at least one additional qubit, the intermediate cycle, or the like. In some exemplary embodiments, the set of qubits and the at least one additional qubit may both exclude qubit allocations, qubit re-usage operations, or the like, leaving such operations to be managed by the processing module of the quantum execution platform.

In some exemplary embodiments, one or more qubit release instructions may be incorporated in the quantum circuit. In some exemplary embodiments, the quantum circuit may be generated to release qubits as soon as possible, e.g., as soon as the qubits are no longer needed by a remaining portion of the quantum circuit. In some cases, the qubit release instructions may correspond to the calculations of Sub-Step 832. For example, a qubit release instruction may be incorporated at a second intermediate cycle of the quantum circuit that is ordered after the intermediate cycle, and may instruct to release the at least one additional qubit at the second intermediate cycle. For example, this may be performed in case that the calculations of Sub-Step 832 indicate that the at least one additional qubit will not be needed by the quantum operations after the second intermediate cycle. In other cases, the qubit release instruction may be incorporated at any other cycle, in any other scenario.

On Step 835, the quantum circuit may be provided to the quantum execution platform, to be executed thereby. In some exemplary embodiments, the quantum circuit may be executed on the quantum execution platform, a computer thereof, or the like.

In some exemplary embodiments, metadata may or may not be determined as part of the compilation process. For example, metadata may indicate connectivity priorities for allocations of physical qubits to the set of one or more qubits and/or the at least one additional qubit, suggestions of constraints, qubit allocation instructions, qubit release instructions, or the like. In some exemplary embodiments, in case metadata is determined for the quantum circuit, the metadata may be provided to the quantum execution platform along with the quantum circuit. For example, the metadata may be determined based on one or more optimizers.

In some exemplary embodiments, at the quantum execution platform, qubits from a qubit pool may be assigned to implement the quantum circuit, e.g., according to the qubit release instructions, the qubit allocation instructions, the available resources, the metadata, or the like. In some exemplary embodiments, the quantum execution platform may convert the quantum circuit to a specific hardware implementation of specified concrete physical gates and physical qubits from the qubit pool. In some exemplary embodiments, the quantum execution platform may obtain the quantum circuit, and implement based thereon a physical circuit, by allocating physical qubits for respective logical qubits, allocating physical gates for the logical gates, or the like.

Figure 9:
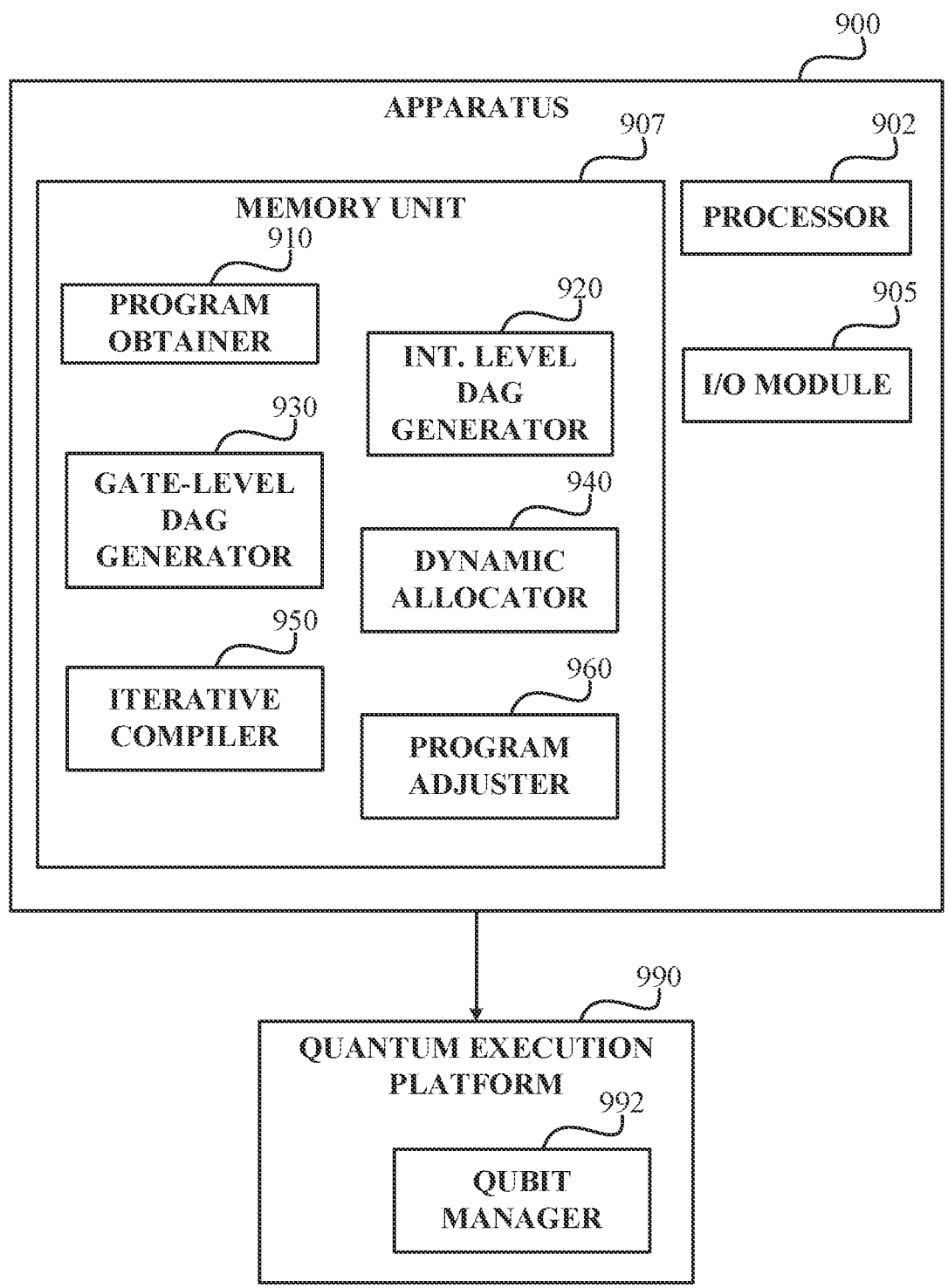
FIG. 9 shows an exemplary block diagram of an apparatus, in accordance with some exemplary embodiments of the disclosed subject matter.

Referring now to FIG. 9 showing a block diagram of an apparatus, in accordance with some exemplary embodiments of the disclosed subject matter.

In some exemplary embodiments, Apparatus 900 may comprise one or more Processor(s) 902. Processor 902 may be a Central Processing Unit (CPU), a microprocessor, an electronic circuit, an Integrated Circuit (IC) or the like. Processor 902 may be utilized to perform computations required by Apparatus 900 or any of its subcomponents. It is noted that Processor 902 may be a traditional processor, and not necessarily a quantum processor.

In some exemplary embodiments of the disclosed subject matter, Apparatus 900 may comprise an Input/Output (I/O) module 905. I/O Module 905 may be utilized to provide an output to and receive input from a user, an apparatus, or the like, such as, for example to obtain a user-defined quantum program, showing circuit illustrations, communicating with quantum hardware, or the like.

In some exemplary embodiments, Apparatus 900 may comprise Memory 907. Memory 907 may be a hard disk drive, a Flash disk, a Random Access Memory (RAM), a memory chip, or the like. In some exemplary embodiments, Memory 907 may retain program code operative to cause Processor 902 to perform acts associated with any of the subcomponents of Apparatus 900. Memory 907 may comprise one or more components as detailed below, implemented as executables, libraries, static libraries, functions, or any other executable components.

In some exemplary embodiments, Memory 907 may comprise a Program Obtainer 910. Program Obtainer 910 may be configured to obtain one or more quantum programs from respective programmers, servers, clients, or the like, e.g., via I/O Module 905.

In some exemplary embodiments, Memory 907 may comprise an Intermediate-Level DAG Generator 920, which may be configured to generate an intermediate-level DAG based on the quantum program, based on global hardware constraints of Quantum Execution Platform 990, based on a selected quantum computer thereof, or the like. In some cases, prior to generating the intermediate-level DAG, Intermediate-Level DAG Generator 920 may generate an initial DAG representing a quantum program obtained at Program Obtainer 910. In some exemplary embodiments, Intermediate-Level DAG Generator 920 may generate the intermediate-level DAG according to the method of FIG. 5. In some exemplary embodiments, Intermediate-Level DAG Generator 920 may provide the intermediate-level DAG to Gate-Level DAG Generator 930, e.g., via I/O Module 905.

In some exemplary embodiments, Memory 907 may comprise a Gate-Level DAG Generator 930, which may be configured to obtain real-time constraints from Quantum Execution Platform 990, via I/O Module 905, and generate a gate-level DAG based thereon. In some exemplary embodiments, Gate-Level DAG Generator 930 may generate the gate-level DAG based on real-time constraints of Quantum Execution Platform 990, a selected quantum computer thereof, the intermediate-level DAG generated by Intermediate-Level DAG Generator 920, or the like.

In some exemplary embodiments, Gate-Level DAG Generator 930 may generate the gate-level DAG by selecting or generating a gate-level implementation for each node of the intermediate-level DAG (in case a gate-level implementation for the node was not yet selected by Intermediate-Level DAG Generator 920). For example, implementations may be selected in case they comply with the real-time constraints, such as according to one or more methods disclosed in U.S. Patent Publication 2023/0111039, titled "Dynamic Synthesis Of Gate-Level Implementations Of Functional Blocks In Quantum Circuits", filed Oct. 12, 2021, which is hereby incorporated by reference in its entirety for all purposes without giving rise to disavowment. In some exemplary embodiments, Gate-Level DAG Generator 930 may generate the gate-level DAG by selecting one or more instances from a library, combining such instances, or the like. In some exemplary embodiments, Gate-Level DAG Generator 930 may generate the gate-level DAG by solving a simplified CSP problem that may be determined by Intermediate-Level DAG Generator 920. In some exemplary embodiments, Gate-Level DAG Generator 930 may generate the gate-level DAG according to the method of FIG. 5.

In some exemplary embodiments, Gate-Level DAG Generator 930 may provide the gate-level DAG to Quantum Execution Platform 990, to be executed thereby. In some exemplary embodiments, Gate-Level DAG Generator 930 may be executed over the gate-level DAG for each execution of the quantum program, while Intermediate-Level DAG Generator 920 may be executed once for the quantum program, and its produced gate-level DAG may be re-used for every execution.

In some exemplary embodiments, Memory 907 may comprise Dynamic Allocator 940, which may be configured to dynamically determine a distribution between computations that are performed by Intermediate-Level DAG Generator 920 and Gate-Level DAG Generator 930. For example, Dynamic Allocator 940 may select a distribution between the computations according to the method of FIG. 6.

In some exemplary embodiments, Memory 907 may comprise an Iterative Compiler 950. In some exemplary embodiments, Iterative Compiler 950 may comprise one or more classical compilation modules, such as a compiler and transpiler of FIG. 1, the Intermediate-Level DAG Generator 920 and the Gate-Level DAG Generator 930, or the like. In some exemplary embodiments, Iterative Compiler 950 may be configured to obtain the quantum program from Program Obtainer 910, and compiler the program iteratively, each iteration including providing the synthesized circuit to be executed by Quantum Execution Platform 990. For example, Iterative Compiler 950 may compile the quantum program according to the method of FIG. 7.

In some exemplary embodiments, Memory 907 may comprise a Program Adjuster 960. In some exemplary embodiments, Program Adjuster 960 may be configured to obtain the quantum program from Program Obtainer 910, and compiler the program to be manageable by a central qubit management, e.g., a processing module of the quantum operating system. In some exemplary embodiments, Program Adjuster 960 may compiler the quantum program to exclude any qubit allocation, qubit reuse operations, or the like, and to include instead one or more qubit allocation instructions, qubit release instructions, or the like. For example, Program Adjuster 960 may compiler the quantum program according to the method of FIG. 8B.

In some exemplary embodiments, Quantum Execution Platform 990 may comprise a Qubit Manager 992, which may obtain a quantum circuit that was compiled by Program Adjuster 960, and allocate qubits thereto according to instructions incorporated within the circuit. For example, Qubit Manager 992 may be comprised by the processing module of the quantum operating system. In some exemplary embodiments, Qubit Manager 992 may manage a qubit pool, allocate and release qubits from executed circuits, reuse idle qubits for one or more additional operations (e.g., quality increasing operations), reuse idle qubits between executed circuits or circuit portions, or the like. For example, Qubit Manager 992 may manage executions and qubits according to the method of FIG. 8A.

In some exemplary embodiments, Quantum Execution Platform 990 may comprise at least one quantum computer, at least one quantum computing cloud, a combination thereof, or the like. In some exemplary embodiments, Quantum Execution Platform 990 may be configured to execute obtained quantum circuits, such as quantum circuits obtained from Iterative Compiler 950, Gate-Level DAG Generator 930, or the like.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   generating, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein the first software compiler is a batch compiler configured to be executed once for the quantum program;
   initiating a first execution of the quantum program at the quantum execution platform, wherein said initiating the first execution comprises:
      obtaining, by a second software compiler that is different from the first software compiler, first real-time constraints on an availability of resources of the quantum execution platform for the first execution, wherein the second software compiler is an online compiler configured to be executed for every execution of the quantum program on the quantum execution platform;
      generating, by the second software compiler, and based on the first real-time constraints, a first quantum circuit that implements the DAG and is executable by the quantum execution platform; and
      providing the first quantum circuit to the quantum execution platform to be executed thereon; and
   initiating a second execution of the quantum program at the quantum execution platform, wherein said initiating the second execution comprises:
      obtaining, by the second software compiler, second real-time constraints on an availability of resources of the quantum execution platform for the second execution;
      generating, by the second software compiler, and based on the second real-time constraints, a second quantum circuit that implements the DAG and is executable by the quantum execution platform, the second quantum circuit is different than the first quantum circuit; and
      providing the second quantum circuit to the quantum execution platform to be executed thereon.

2. The method of claim 1,
   wherein the intermediate-level data structure comprises two or more alternative implementations of a node of the at least one node that is not executable by the quantum execution platform;
   wherein said generating the first quantum circuit comprises selecting a first implementation from the two or more alternative implementations of the node; and
   wherein said generating the second quantum circuit comprises selecting a second implementation from the two or more alternative implementations of the node, the second implementation is different from the first implementation.

3. The method of claim 2, wherein said generating the intermediate-level data structure comprises selecting from a library a subset of potential alternative implementations of the node, wherein the subset comprises the two or more alternative implementations.

4. The method of claim 2, wherein said generating the intermediate-level data structure comprises dynamically synthesizing the first implementation and the second implementation.

5. The method of claim 1, wherein said generating the intermediate-level data structure comprises synthesizing an executable node, the executable node is executable by the quantum execution platform, wherein the DAG comprises the executable node, wherein the first and second quantum circuits comprise the executable node, whereby computational resources associated with synthesizing the executable node are utilized only once by the first software compiler, and the second software compiler utilizes an outcome of the first software compiler, thereby the computational resources are not utilized by the second software compiler.

6. The method of claim 1, wherein an availability of the resources comprise at least one of:
   a connectivity configuration of available qubits of the quantum execution platform;
   a number of the available qubits of the quantum execution platform for a time period; and
   a number of the available qubits of the quantum execution platform of a specific qubit type for a timeframe.

7. The method of claim 1, wherein the first real-time constraints depend on a previous quantum circuit that is being executed on the quantum execution platform, the previous quantum circuit implements a second quantum program.

8. The method of claim 7, wherein the quantum program and the second quantum program are provided to the first software compiler from different entities.

9. The method of claim 1, wherein the second real-time constraints depend on the first execution of the first quantum circuit by the quantum execution platform, whereby the second execution of the second quantum circuit is generated to be performed in parallel to at least a portion of the first execution of the first quantum circuit.

10. The method of claim 1, wherein the intermediate-level data structure excludes any implementation of a node of the DAG, wherein the implementation of the node is determined by the second software compiler.

11. The method of claim 1, wherein the quantum execution platform comprises a quantum computing cloud or a quantum computer.

12. The method of claim 1, wherein an implementation of a node of the DAG comprises a set of one or more logical qubits that are being manipulated over a plurality of cycles.

13. The method of claim 1, wherein the DAG comprises at least one node that is represented by a functional block, the functional block representing the functionality that the quantum program is designed to implement in the quantum circuit.

14. The method of claim 1, wherein the second quantum circuit utilizes different quantum resources than the first quantum circuit, the quantum resources comprise at least qubits, gates, and cycles.

15. The method of claim 1 further comprising obtaining the quantum program from a programmer.

16. The method of claim 1, wherein said generating the intermediate-level data structure is performed as part of a compilation process of the quantum program, the compilation process includes parsing the quantum program, whereby the second software compiler is configured to avoid parsing the quantum program and to re-use an output of the first software compiler.

17. A method comprising:
  generating, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein said generating the intermediate-level data structure comprises:
    determining a Constraint Satisfaction Problem (CSP) that corresponds to the quantum program, the CSP comprises variables, domains and constraints, each variable of the variables has a corresponding domain in the domains that defines one or more potential values of the variable, the constraints define one or more constraints on values of the variables or portion thereof, the constraints comprise global resource constraints of the quantum execution platform, the domains include a domain of a variable, wherein a solution of the CSP defines a quantum circuit that implements the quantum program and complies with the constraints;
    determining a sub-domain for the variable, whereby defining a simplified CSP, the simplified CSP uses the sub-domain instead of the domain with respect to the variable, a solution of the simplified CSP defines a respective quantum circuit that implements the quantum program;
  initiating a first execution of the quantum program at the quantum execution platform, wherein said initiating the first execution comprises:
    obtaining, by a second software compiler that is different from the first software compiler, first real-time constraints on an availability of resources of the quantum execution platform for the first execution;
    generating, by the second software compiler, and based on the first real-time constraints, a first quantum circuit that implements the DAG and is executable by the quantum execution platform, wherein said generating the first quantum circuit comprises defining a first execution-specific simplified CSP that comprises the simplified CSP and the first real-time constraints, and utilizing a CSP solver to solve the first execution-specific simplified CSP, whereby the CSP solver utilizes a reduced amount of computational resources for solving the first execution-specific simplified CSP compared to an amount of computational resources that is required for solving an execution-specific CSP that includes the CSP and the first real-time constraints; and
    providing the first quantum circuit to the quantum execution platform to be executed thereon; and
  initiating a second execution of the quantum program at the quantum execution platform, wherein said initiating the second execution comprises:
    obtaining, by the second software compiler, second real-time constraints on an availability of resources of the quantum execution platform for the second execution;
    generating, by the second software compiler, and based on the second real-time constraints, a second quantum circuit that implements the DAG and is executable by the quantum execution platform, the second quantum circuit is different than the first quantum circuit, wherein said generating the second quantum circuit comprises defining a second execution-specific simplified CSP that comprises the simplified CSP and the second real-time constraints, and utilizing the CSP solver to solve the second execution-specific simplified CSP, and
    providing the second quantum circuit to the quantum execution platform to be executed thereon,
  whereby the CSP solver utilizes a reduced amount of computational resources for solving the second execution-specific simplified CSP compared to an amount of computational resources that is required for solving an execution-specific CSP that includes the CSP and the second real-time constraints.

18. The method of claim 17, wherein the constraints of the CSP comprise the precedence constraint of each edge of the DAG.

19. The method of claim 17, wherein said determining the sub-domain comprises:
  determining that all solutions of the CSP comprise a same single value of the variable, wherein the domain includes the single value and at least one additional value; and
  determining the sub-domain to be a singleton domain consisting of only the same single value.

20. An apparatus comprising a processor and coupled memory, said processor being adapted to:
  generate, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein the first software compiler is a batch compiler configured to be executed once for the quantum program;
  initiate a first execution of the quantum program at the quantum execution platform, wherein said initiate the first execution comprises:
    obtaining, by a second software compiler that is different from the first software compiler, first real-time constraints on an availability of resources of the quantum execution platform for the first execution, wherein the second software compiler is an online compiler configured to be executed for every execution of the quantum program on the quantum execution platform;

generating, by the second software compiler, and based on the first real-time constraints, a first quantum circuit that implements the DAG and is executable by the quantum execution platform; and providing the first quantum circuit to the quantum execution platform to be executed thereon; and initiate a second execution of the quantum program at the quantum execution platform, wherein said initiate the second execution comprises:

obtaining, by the second software compiler, second real-time constraints on an availability of resources of the quantum execution platform for the second execution;

generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

21. The apparatus of claim 20, wherein the intermediate-level data structure comprises two or more alternative implementations of a node of the at least one node that is not executable by the quantum execution platform;

wherein said generating the first quantum circuit comprises selecting a first implementation from the two or more alternative implementations of the node; and wherein said generating the second quantum circuit comprises selecting a second implementation from the two or more alternative implementations of the node, the second implementation is different from the first implementation.

22. The apparatus of claim 20, wherein said generating the intermediate-level data structure comprises synthesizing an executable node, the executable node is executable by the quantum execution platform, wherein the DAG comprises the executable node, wherein the first and second quantum circuits comprise the executable node, whereby computational resources associated with synthesizing the executable node are utilized only once by the first software compiler, and the second software compiler utilizes an outcome of the first software compiler, thereby the computational resources are not utilized by the second software compiler.

23. The apparatus of claim 20, wherein the first real-time constraints depend on a previous quantum circuit that is being executed on the quantum execution platform, the previous quantum circuit implements a second quantum program.

24. A computer program product comprising a non-transitory computer readable medium retaining program instructions, which program instructions, when read by a processor, cause the processor to:

generate, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein the first software compiler is a batch compiler configured to be executed once for the quantum program;

initiate a first execution of the quantum program at the quantum execution platform, wherein said initiate the first execution comprises:

obtaining, by a second software compiler that is different from the first software compiler, first real-time constraints on an availability of resources of the quantum execution platform for the first execution, wherein the second software compiler is an online compiler configured to be executed for every execution of the quantum program on the quantum execution platform;

generating, by the second software compiler, and based on the first real-time constraints, a first quantum circuit that implements the DAG and is executable by the quantum execution platform; and providing the first quantum circuit to the quantum execution platform to be executed thereon; and initiate a second execution of the quantum program at the quantum execution platform, wherein said initiate the second execution comprises:

obtaining, by the second software compiler, second real-time constraints on an availability of resources of the quantum execution platform for the second execution;

generating, by the second software compiler, and based on the second real-time constraints, a second quantum circuit that implements the DAG and is executable by the quantum execution platform, the second quantum circuit is different than the first quantum circuit; and providing the second quantum circuit to the quantum execution platform to be executed thereon.

25. A computer program product comprising a non-transitory computer readable medium retaining program instructions, which program instructions, when read by a processor, cause the processor to perform:

generating, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein said generating the intermediate-level data structure comprises:

determining a Constraint Satisfaction Problem (CSP) that corresponds to the quantum program, the CSP comprises variables, domains and constraints, each variable of the variables has a corresponding domain in the domains that defines one or more potential values of the variable, the constraints define one or more constraints on values of the variables or portion thereof, the constraints comprise global resource constraints of the quantum execution platform, the domains include a domain of a variable, wherein a solution of the CSP defines a quantum circuit that implements the quantum program and complies with the constraints;

determining a sub-domain for the variable, whereby defining a simplified CSP, the simplified CSP uses the sub-domain instead of the domain with respect to the variable, a solution of the simplified CSP defines a respective quantum circuit that implements the quantum program;

initiating a first execution of the quantum program at the quantum execution platform, wherein said initiating the first execution comprises:

obtaining, by a second software compiler that is different from the first software compiler, first real-time constraints on an availability of resources of the quantum execution platform for the first execution;

generating, by the second software compiler, and based on the first real-time constraints, a first quantum circuit that implements the DAG and is executable by the quantum execution platform, wherein said generating the first quantum circuit comprises defining a first execution-specific simplified CSP that comprises the simplified CSP and the first real-time constraints, and utilizing a CSP solver to solve the first execution-specific simplified CSP, whereby the CSP solver utilizes a reduced amount of computational resources for solving the first execution-specific simplified CSP compared to an amount of computational resources that is required for solving an execution-specific CSP that includes the CSP and the first real-time constraints; and providing the first quantum circuit to the quantum execution platform to be executed thereon; and initiating a second execution of the quantum program at the quantum execution platform, wherein said initiating the second execution comprises:

obtaining, by the second software compiler, second real-time constraints on an availability of resources of the quantum execution platform for the second execution;

generating, by the second software compiler, and based on the second real-time constraints, a second quantum circuit that implements the DAG and is executable by the quantum execution platform, the second quantum circuit is different than the first quantum circuit, wherein said generating the second quantum circuit comprises defining a second execution-specific simplified CSP that comprises the simplified CSP and the second real-time constraints, and utilizing the CSP solver to solve the second execution-specific simplified CSP, and providing the second quantum circuit to the quantum execution platform to be executed thereon, whereby the CSP solver utilizes a reduced amount of computational resources for solving the second execution-specific simplified CSP compared to an amount of computational resources that is required for solving an execution-specific CSP that includes the CSP and the second real-time constraints.

26. An apparatus comprising a processor and coupled memory, said processor being adapted to perform:

generating, by a first software compiler, an intermediate-level data structure based on a quantum program, the intermediate-level data structure is a Directed Acyclic Graph (DAG), the DAG comprises nodes and edges, wherein each node of the DAG represents a functionality that the quantum program is designed to implement in a quantum circuit, wherein each edge of the DAG corresponds to a precedence constraint between two functionalities, wherein the DAG is a non-executable representation of the quantum program, wherein the DAG comprises at least one node that is not executable by a quantum execution platform, wherein said generating the intermediate-level data structure comprises:

determining a Constraint Satisfaction Problem (CSP) that corresponds to the quantum program, the CSP comprises variables, domains and constraints, each variable of the variables has a corresponding domain in the domains that defines one or more potential values of the variable, the constraints define one or more constraints on values of the variables or portion thereof, the constraints comprise global resource constraints of the quantum execution platform, the domains include a domain of a variable, wherein a solution of the CSP defines a quantum circuit that implements the quantum program and complies with the constraints;

determining a sub-domain for the variable, whereby defining a simplified CSP, the simplified CSP uses the sub-domain instead of the domain with respect to the variable, a solution of the simplified CSP defines a respective quantum circuit that implements the quantum program;

initiating a first execution of the quantum program at the quantum execution platform, wherein said initiating the first execution comprises:

obtaining, by a second software compiler that is different from the first software compiler, first real-time constraints on an availability of resources of the quantum execution platform for the first execution;

generating, by the second software compiler, and based on the first real-time constraints, a first quantum circuit that implements the DAG and is executable by the quantum execution platform, wherein said generating the first quantum circuit comprises defining a first execution-specific simplified CSP that comprises the simplified CSP and the first real-time constraints, and utilizing a CSP solver to solve the first execution-specific simplified CSP, whereby the CSP solver utilizes a reduced amount of computational resources for solving the first execution-specific simplified CSP compared to an amount of computational resources that is required for solving an execution-specific CSP that includes the CSP and the first real-time constraints; and providing the first quantum circuit to the quantum execution platform to be executed thereon; and initiating a second execution of the quantum program at the quantum execution platform, wherein said initiating the second execution comprises:

obtaining, by the second software compiler, second real-time constraints on an availability of resources of the quantum execution platform for the second execution;

generating, by the second software compiler, and based on the second real-time constraints, a second quantum circuit that implements the DAG and is executable by the quantum execution platform, the second quantum circuit is different than the first quantum circuit, wherein said generating the second quantum circuit comprises defining a second execution-specific simplified CSP that comprises the simplified CSP and the second real-time constraints, and utilizing the CSP solver to solve the second execution-specific simplified CSP, and providing the second quantum circuit to the quantum execution platform to be executed thereon, whereby the CSP solver utilizes a reduced amount of computational resources for solving the second execution-specific simplified CSP compared to an amount of computational resources that is required for solving an execution-specific CSP that includes the CSP and the second real-time constraints.

* * * * *